United States Patent

Suga et al.

[11] Patent Number: 5,132,803
[45] Date of Patent: Jul. 21, 1992

[54] IMAGE PICKUP DEVICE HAVING A FRAME SIZE MEMORY

[75] Inventors: Akira Suga, Tokyo; Eiji Ohara, Kawasaki, both of Japan

[73] Assignee: Canon Kabushiki Kaisha, Tokyo, Japan

[21] Appl. No.: 664,860

[22] Filed: Mar. 5, 1991

Related U.S. Application Data

[63] Continuation of Ser. No. 400,110, Aug. 29, 1989.

[30] Foreign Application Priority Data

Aug. 31, 1988 [JP] Japan .................................. 63-216496
Aug. 31, 1988 [JP] Japan .................................. 63-216497
Aug. 31, 1988 [JP] Japan .................................. 63-216498
Nov. 19, 1988 [JP] Japan .................................. 63-292644

[51] Int. Cl.$^5$ .......................... H04N 3/14; H04N 5/335
[52] U.S. Cl. .............................. 358/213.29; 358/43; 358/213.27; 358/213.25
[58] Field of Search .................... 358/213.23, 213.29, 358/213.27, 213.25, 43, 44

[56] References Cited

U.S. PATENT DOCUMENTS

| | | | |
|---|---|---|---|
| 4,513,313 | 4/1985 | Kinoshita et al. | 358/44 |
| 4,528,595 | 7/1985 | Eouzan | 358/213.29 |
| 4,580,160 | 4/1986 | Ochi et al. | 358/44 |
| 4,635,122 | 1/1987 | Kato et al. | 358/213.29 |
| 4,811,105 | 3/1989 | Kinoshita et al. | 358/213.25 |
| 4,831,453 | 5/1989 | Takemura | 358/213.23 |
| 4,839,734 | 6/1989 | Takemura | 358/213.29 |
| 4,985,758 | 1/1991 | Hashimoto | 358/44 |

Primary Examiner—David K. Moore
Assistant Examiner—Wendy R. Greening
Attorney, Agent, or Firm—Fitzpatrick, Cella, Harper & Scinto

[57] ABSTRACT

An image pickup device for temporarily storing photoelectrically converted signals of a photoelectric conversion unit in a memory device capable of storing at least one field from the image pickup device. The signals stored fin the memory unit are then read-out of the memory means and input into three read-out units. Two neighboring rows of the memory unit at a time are read out alternately and divided between the three read-out units.

3 Claims, 23 Drawing Sheets

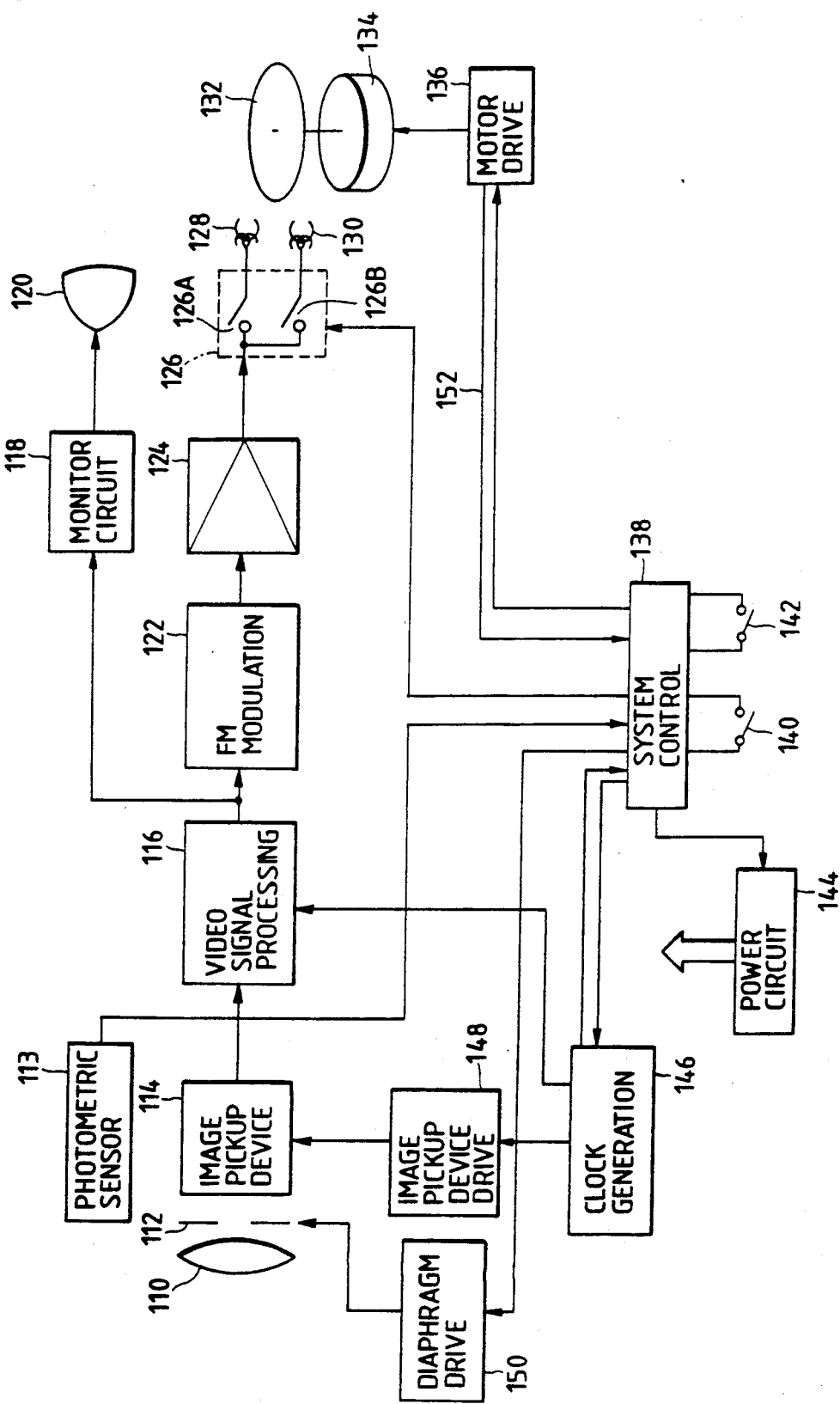

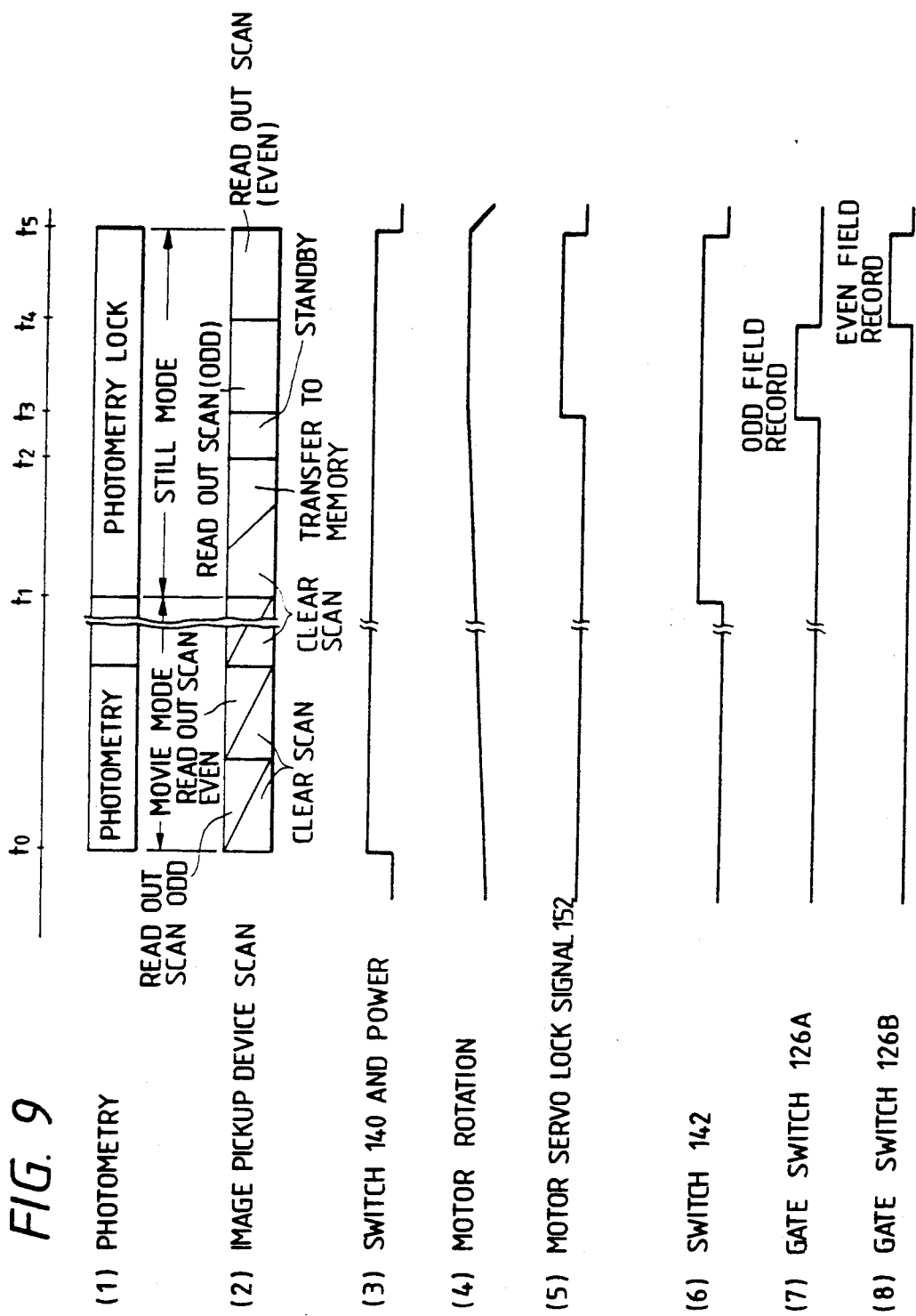

(a) ODD FIELD READ OUT SCAN ( n IS ODD NUMBER )

(b) EVEN FIELD READ OUT SCAN ( n IS EVEN NUMBER )

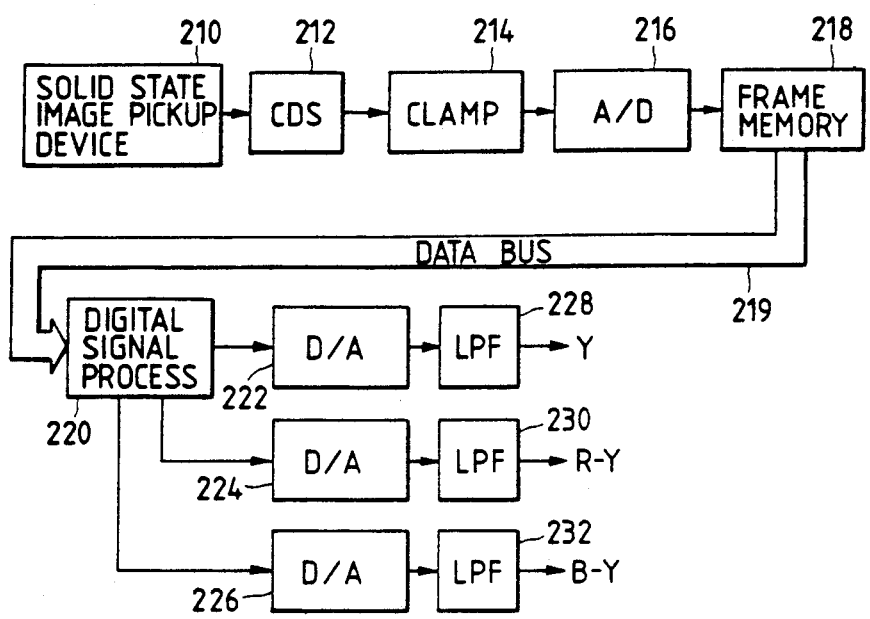
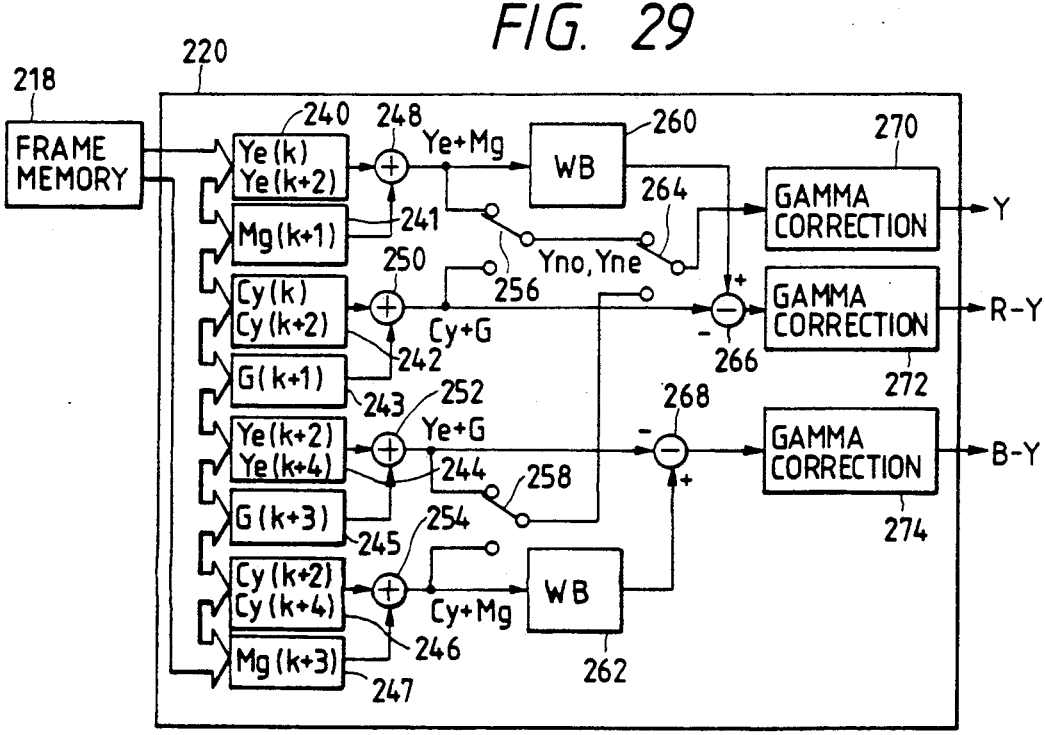

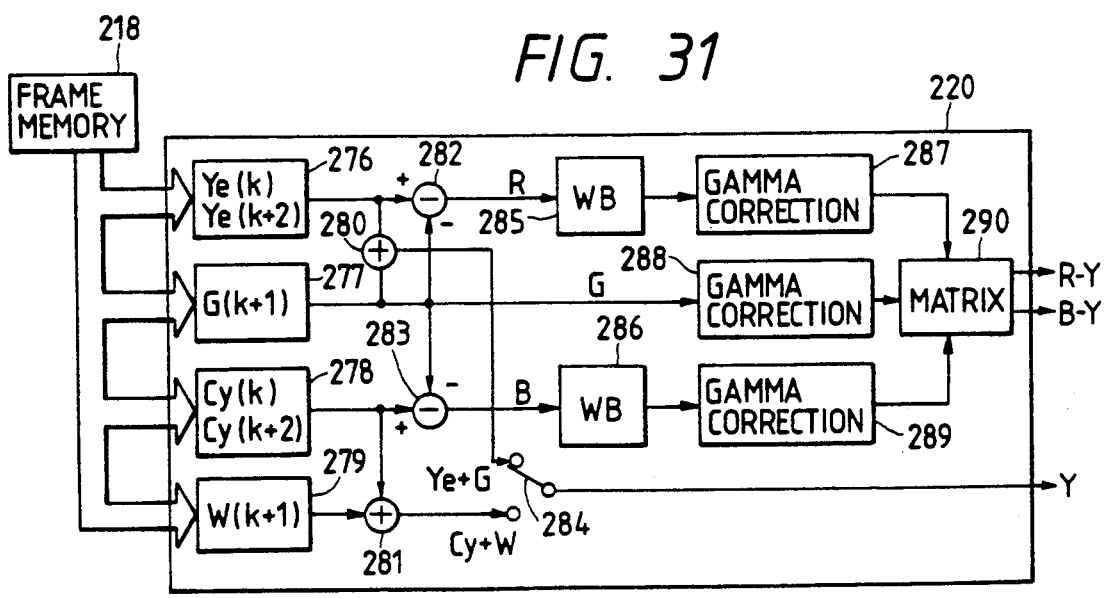

5,132,803

IMAGE PICKUP DEVICE HAVING A FRAME SIZE MEMORY

This application is a continuation of application Ser. No. 07/400,110 filed Aug. 29, 1989.

BACKGROUND OF THE INVENTION

1. Field of the Invention

The present invention relates to an image pickup device with an electronic shutter function.

2. Related Background Art

In recent years there has been proposed a sensor of the FGA (floating gate array) type. FIG. 1 is a block diagram showing an example of an area sensor of the FGA type mentioned above. There are provided a photoelectric conversion unit 10 in which a plurality of photoelectric conversion cells 10C are arranged in a matrix shape; vertical address lines 10V for designating the vertical address; signal reading lines 10S for reading the photoelectric conversion cells of a row designated by the vertical address line 10V; a resetting circuit 12 for resetting the photoelectrically converted signals in the photoelectric conversion circuit 10; a clamping circuit 14; a line memory 16; an output signal line 18 for reading the signals stored in the line memory 16 in succession in the horizontal direction; a horizontal shift register 20 for designating the signal reading position of the line memory 16; switches 22 controlled by said shift register 20; an output buffer 24 of a high input impedance; and an output terminal 26.

An address decoder 28 selectively activates the vertical address lines 10 of the photoelectric conversion unit 10. A decoder driving circuit 30 designates the vertical address line to be activated by the address decoder 28, according to vertical address data $D_{VA}$. The address decoder 28 sends a signal $\phi_H$ to the vertical address line 10V for a row for which the signal reading or resetting is to be conducted, and a signal $\phi_L$ to other vertical address lines 10V. 32 indicates coupling capacitors.

There are further shown resetting FET's 12T; clamping FET's 14T; switching FET's 16T for storing the output signals of the clamping circuit 14 in the line memory 16; memory capacitors 16M; a reset pulse $\phi_G$ for controlling the resetting FET's 12T of the resetting circuit 12; a clamp voltage $V_R$; a clamping pulse $\phi_C$; a sample-hold clock $\phi_{SH}$ for controlling the FET's 16T; a start pulse STATH for activating the shift register 20; and a shift pulse $\phi_S$ for the shift register 20.

The line memory 16 and the clamping circuit 14 are shielded from external light.

FIG. 2 shows the structure of a photoelectric conversion cell 10C, and FIG. 3 shows the function timing thereof. A pulse source 34 for generating clock signals $\phi_H$, $\phi_L$ corresponds to the address decoder 28 shown in FIG. 1. An N-channel junction FET 36 with a floating gate G constitutes a light-receiving element, and is connected to the vertical address line 10V through a capacitor 38. The drain of the FET 36 is connected to a DC power source $V_{DD}$, and the source S is connected to a resetting FET 12T of the resetting circuit 12, and also to a signal reading line 10S. Referring to FIG. 3, when the vertical address line 10V is shifted to an H-level by the pulse source 34 in a period from $t_1$ to $t_2$, the gate-drain junction of the FET 36 is biased in the forward direction, whereby the capacitor 38 is pre-charged. If the gate area of the FET 36 is not irradiated with light, said gate remains in the fully inversely biased state (broken line in FIG. 3) in a period $t_2$-$t_3$. If the gate area is irradiated with light, the capacitor 38 is gradually discharged by the photo-induced charge, whereby the gate potential is elevated (solid line in FIG. 3). Since the source potential of the FET 36 follows the gate potential, a voltage corresponding to the intensity of incident light can be obtained on the signal readout line 10S.

FIG. 4 shows the timing of an image taking operation of the image pickup device shown in FIG. 1. A horizontal blanking period is started by a horizontal blanking signal HBLK, and a vertical address $D_{VA}$ is supplied to the decoder driving circuit 30 at a time $t_1$, whereby a signal $\phi_H$ is supplied in succession to the vertical address lines 10V, while a signal $\phi_L$ is given to other vertical address lines. When the signal $\phi_L$ assumes the L-level at the time $t_1$, all the FET's 36 of the photoelectric conversion cells 10C receiving said signal are turned off, so that only the signals of the photoelectric conversion cells 10C connected to the designated vertical address line 10V are supplied to the signal readout line 10S. As the clamping pulse $\phi_C$ and the sample-hold pulse $\phi_{SH}$ are at the H-level in the period from $t_1$ to $t_2$, the capacitors 16M of the line memory 16 are reset to a reference potential $V_R$. The clamping FET's 14T are opened at the time $t_3$. When the clock signal $\phi_H$ assumes the H-level in a period from $t_4$ to $t_5$, the capacitors 38 are pre-charged, wherein the charges across the coupling capacitors 32 are proportional to the amounts of charge generated by photo-induced voltages in the photoelectric conversion cells 10C. Said voltages of the coupling capacitors 32 are transferred to and stored in the capacitors 16M in response to the H-level of the signal $\phi_{SH}$ in a period from the time $t_6$ to $t_7$.

A resetting operation for controlling the charge accumulating time is conducted in a period from $t_9$ to $t_{11}$. The vertical line address to be reset is designated at the time $t_9$, and the charges of the designated line are reset in a period $t_{10}$-$t_{11}$. The charge accumulation is conducted from the resetting to the next signal reading from this line. The horizontal shift register 20 is driven by the shift pulses $\phi_S$ starting from a time $t_{13}$, whereby the signals stored in the capacitors 16M are transferred, in succession, to the output line 18, and are released to the output terminal 26 through the buffer 24.

A conceivable application of the above-explained area sensor of the FGA type is in the recently commercialized electronic still camera. In the electronic still camera, a frame recording of an image signal is made possible for improving the quality of the recorded image. However, the output of such an image pickup device is recorded in the form of an odd field and an even field on a magnetic disk. The timing of photoelectric conversion for the odd field is different by 1/60 seconds from that for the even field. However, in case of a moving object, the position of the object is different between the different fields, so that a satisfactory image cannot be obtained as a frame image. A problem is not limited to the image pickup device of the FGA type but commonly exists in the image pickup devices of the MOS, or the SIT type, and in XY-addressed sensors composed of bipolar transistors.

Also such a sensor may be used in a hand-held video cassette recorder combined with a camera, or an electronic still camera. Such equipment usually has a reproducing function, and the reproducing circuit has been complicated by the use of a 1H delay device for example in a dropout compensating circuit or a circuit for multiplexing sequential color difference signals.

Also in the conventional equipment, a 1H delay line is also required for correcting the vertical aperture, and the circuit becomes inevitably large for this reason. Furthermore, for obtaining an uncorrelated component with a subtractor, gain control has to be made achieved for example with resistors. Furthermore, in case of interlace reading, vertical aperture correction has conventionally been conducted between two horizontal signals across a horizontal line. However, if the vertical aperture correction is conducted between mutually neighboring horizontal signal lines, there is required a 1V delay line such as a field memory, instead of the 1H delay line, so that the circuit becomes even larger.

Also in the conventional signal charge reading with two rows at a time, all the charges of the pixels of the solid-state image pickup device are destructively read by two rows at a time for obtaining a still image of a field, so that the image of the second field cannot be obtained. Stated differently, for obtaining a still image of a frame, there is required an image pickup device having a doubled resolution in the vertical direction, which is extremely expensive and is not usable for a consumer electronic appliance such as the electronic still camera.

SUMMARY OF THE INVENTION

In consideration of the foregoing, an object of the present invention is to provide an image pickup device capable of providing a still frame image with reduced blur even for a moving object.

Another object of the present invention is to provide an image pickup device in which a line memory contained therein can be utilized as a delay device.

Still another object of the present invention is to provide an image pickup device composed of an improved area sensor of the FGA type capable of vertical aperture correction with a simplified circuit structure.

Still another object of the present invention is to provide an image pickup device capable of providing a still frame image of a practically satisfactory image quality, even with a solid-state image sensor having a conventional vertical resolution.

The image pickup device of the present invention, in which the photoelectrically converted signals of a photoelectric conversion unit are transferred to memory means by a line at a time, and the signals stored in said memory means are sequentially transferred to an output signal line, is characterized by a fact that said memory means is a frame memory capable of storing all the photoelectrically converted signals of said photoelectric conversion unit.

Since said memory means is a frame memory, and all the photoelectrically converted signals of the photoelectric conversion unit are once stored in said frame memory, the difference in photographing time is practically cancelled between the odd and even fields. Consequently a still frame image with reduced image blur can be obtained even from a moving object.

Also, the image pickup device constituting another embodiment of the present invention, in which the image signals from a photoelectric conversion unit are transferred once to a line memory by a line at a time, and the signals stored in said line memory are transferred to an output signal line in horizontal sequential order by controlling switch means in said order by horizontal scanning means, comprises an external input terminal connected to said output signal line through gate means, and an input terminal for a control signal for controlling said gate means.

The above-mentioned structure allows, gate means to avoid the influence of the external input terminal on the output signal line. Also said line memory can be used as a delay line, by closing the transfer path from the photoelectric conversion unit to said line memory, suitably controlling said gate means and driving said horizontal scanning means in synchronization with the horizontal synchronization signal.

The 1H delay line is frequently utilized in image signal processing, and the use of a line memory contained in the image pickup device allows to a reduction in the number of circuit components, thereby reducing the size of the entire circuit.

The image pickup device constituting still another embodiment of the present invention is characterized by the presence of at least two readout circuits capable of respectively reading the signals of arbitrary horizontal lines.

In the above-mentioned structure, the image quality in the vertical direction can be improved by reading the signal of an arbitrary horizontal line with a readout circuit while reading, substantially simultaneously, the signal of another arbitrary horizontal line with the other readout circuit, obtaining the uncorrelated component of the thus substantially simultaneously read image signals and adding said component to the output image signal, and the circuit therefor can be simplified.

The image pickup device constituting still another embodiment of the present invention is characterized by the presence of image pickup means with a color filter of such arrangement as to obtain a luminance signal and color signals of a horizontal scanning line from the charge information of two mutually neighboring horizontal lines; memory means for storing the signals of respective colors of said color filter, obtained from said image pickup means; and frame image forming means for forming the image signals of a first field and a second field from the signals stored in said memory means.

In the above-mentioned structure, since the data of all pixels are once stored in said memory means, the photoelectrically converted signals of each color component in all the pixels of the image taking means can be utilized plural times. Thus the data stored in said memory means can be utilized for forming the image signals of the first and second fields, so that a still frame image can be obtained with a single exposure.

The foregoing and still other objects of the present invention, and the advantages thereof, will become fully apparent from the following description which is to be taken in conjunction with the attached drawings.

BRIEF DESCRIPTION OF THE DRAWINGS

FIG. 8 is a block diagram of an electronic still camera;

FIG. 9 is a timing chart of the operation of the circuit shown in FIG. 8;

FIG. 27 is a block diagram of an embodiment of the present invention;

FIG. 28 shows an example of an arrangement of a color filter;

FIG. 29 is a detailed block diagram of a digital signal processing circuit 220 shown in FIG. 27;

FIG. 30 is a view showing another color filter arrangement; and

FIG. 31 is a block diagram of a digital signal processing circuit 20 corresponding to the color filter arrangement shown in FIG. 30.

DETAILED DESCRIPTION OF THE PREFERRED EMBODIMENTS

Now the present invention will be clarified in detail by embodiments thereof shown in the attached drawings.

Figure 1:
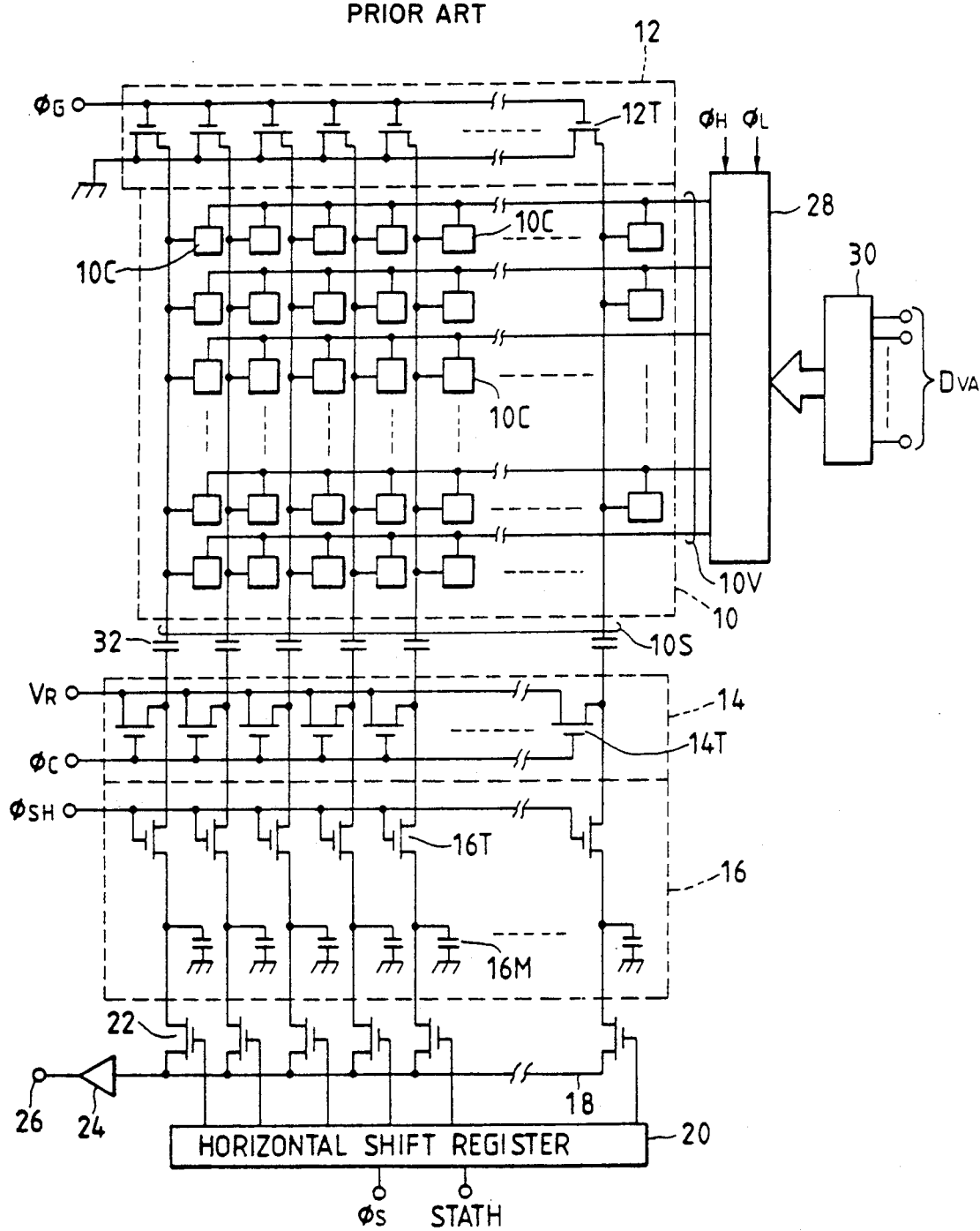
FIG. 1 is a block diagram of a conventional area sensor of the FGA type.
Figure 2:
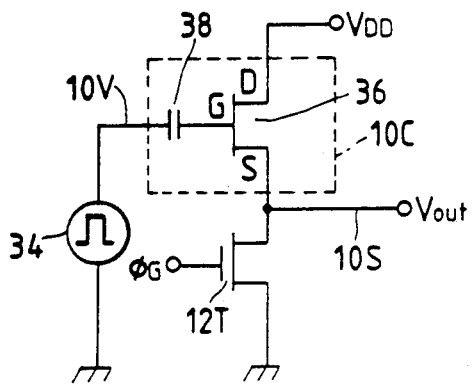
FIG. 2 is a circuit diagram of a photoelectric conversion cell 10C shown in FIG. 1.
Figure 3:
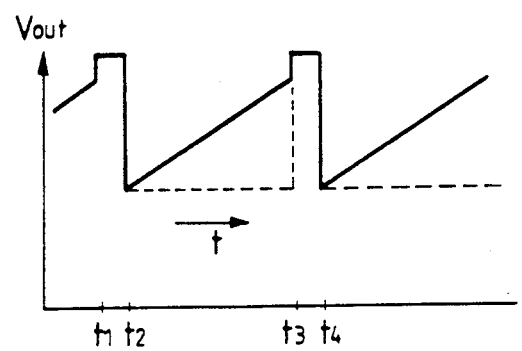
FIG. 3 is a wave form chart of said photoelectric conversion cell 10C.
Figure 5:
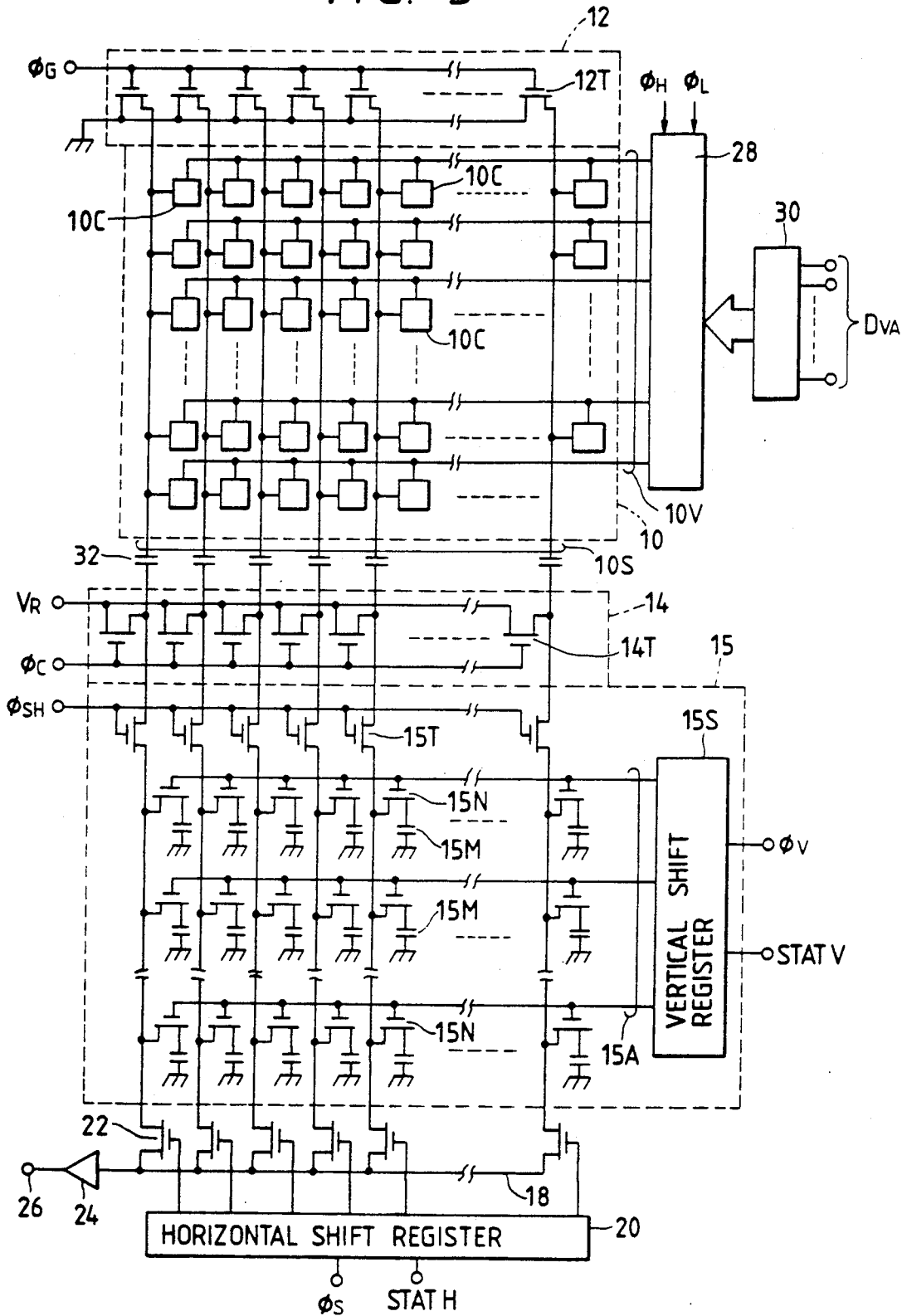
FIG. 5 is a block diagram of a first embodiment of the present invention.

FIG. 5 is a block diagram of a first embodiment of the present invention, wherein the same components as those in FIG. 1 are represented by the same numbers. There are shown a frame memory 15 having a memory capacity of one frame, replacing the line memory 16 shown in FIG. 1; switching FET's 15T for entering the output of the clamping circuit 14 into the frame memory 15; memory capacitors 15M; and writing and reading FET's 15N for said memory capacitors 15M. The memory capacitors 15M are provided respectively corresponding to the photoelectric conversion cells of the photoelectric conversion unit 10, and the capacitor 15M to be written or to be read is designated by a vertical shift register 15S. A start pulse STATV activates said vertical shift register 15S. The vertical shift register 15S is given shift pulses $\phi_V$. The frame memory 15 and the clamping circuit 14 are shielded from external light.

In the image pickup device shown in FIG. 5, a STAT pulse is supplied to the vertical shift register 15S at the start of power supply. If the clock signal $\phi_V$ is not supplied thereafter, the first row only of the frame memory 15 is enabled. Thus, the frame memory 15 functions as a line memory 16. In this state the photoelectrically converted signals of a row from the photoelectric conversion unit 10 is temporarily stored, through the clamping circuit 14, in the memory cells of the first row of said frame memory 15, and are supplied in succession to horizontal signal readout line 18. In the present specification, this operation is called a movie mode.

Figure 6:
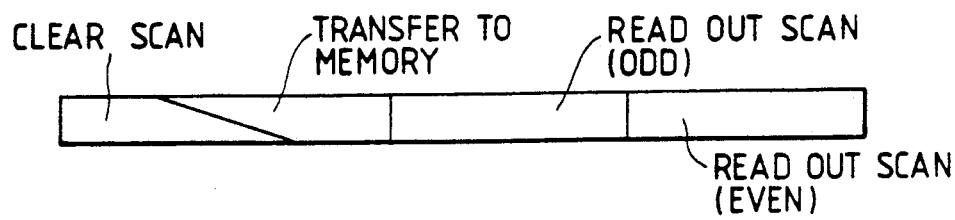
FIG. 6 is a timing chart of the image pickup device shown in FIG. 5 in a still mode.

FIG. 6 shows the sequence of the still mode, for obtaining an odd field signal and an even field signal, for obtaining a still frame image. At first a clear scanning for clearing the charge from the photoelectric conversion cells 10C is started for each row. In the photoelectric conversion cells 10C of the cleared line, there is started the charge accumulation corresponding to the intensity of incident light, and after the lapse of a predetermined accumulation time, there is started the transfer to the memory 15. In said transfer operation, the charges of all the photoelectric conversion cells 10C are transferred to the frame memory 15, and then the signal is readout for an odd field, then an even field, from the frame memory 15. In this still mode, the accumulation time for each row is continuously variable. Since there is no difference of 1/60 seconds between the lines as in the conventional structure, there can be obtained a still image without blur even in a moving object.

Figure 7A:
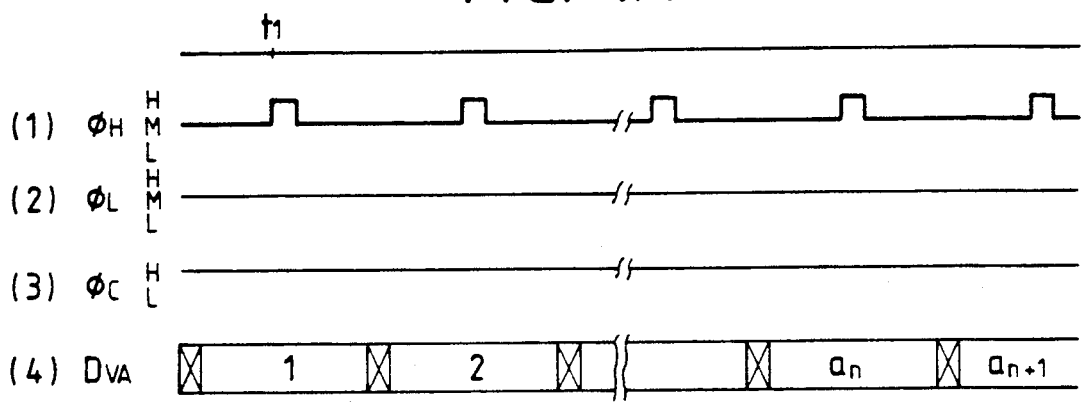
FIGS. 7A, 7B, 7C, 7D and 7E are more detailed timing charts.

FIG. 7A shows the drive timing of the image pickup device of FIG. 1 in the clear scanning. All the photoelectric conversion cells 10C of a selected line are cleared by setting the clear pulse $\phi_C$ at the H-level, setting the address of the line to be cleared as the vertical address $D_{VA}$, and setting $\phi_H$ at the H-level.

Figure 7B:
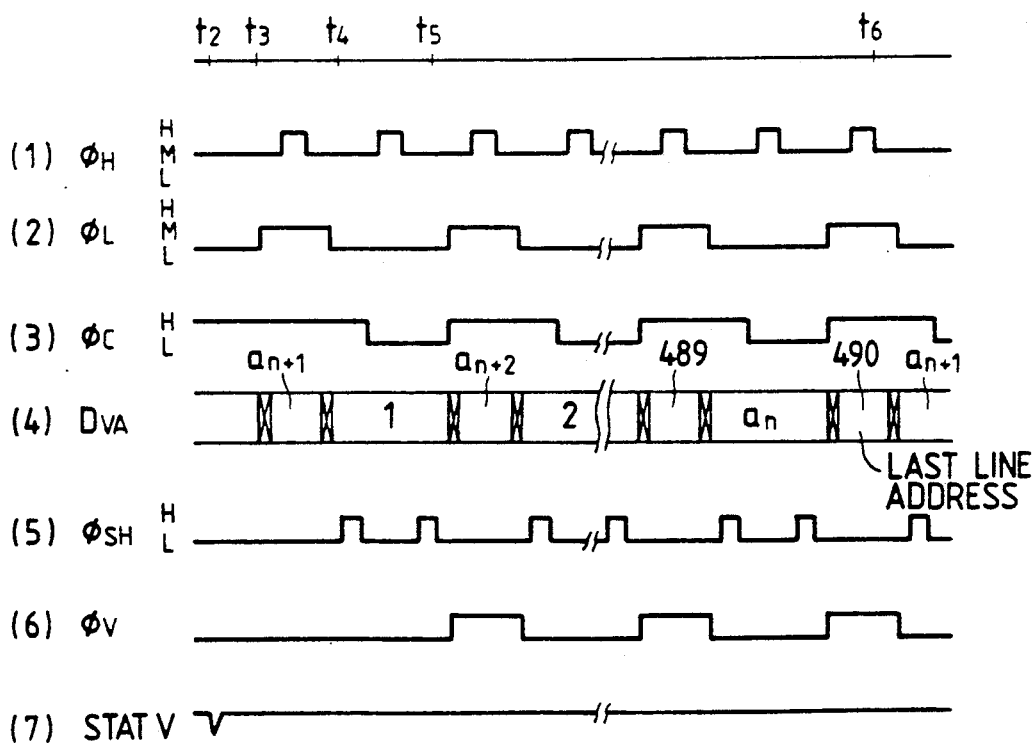

FIG. 7B shows the drive timing of the image pickup device shown in FIG. 5 around the start of signal transfer to the memory. It is assumed that the clear scanning has not been completed. In such a situation, the clear scanning and the transfer to the memory are conducted alternately. When the STATV pulse is supplied at $t_2$, the vertical shift register 15S is reset to a value indicating the first row of the frame memory 15, whereby the switching transistors 15N of the first row are turned on by a vertical address line 15A. Thus, the charges accumulated in the photoelectric conversion cells 10C of the first row of the photoelectric conversion unit 10 are transferred to the capacitors 15M of the first row in the frame memory 15 in a period $t_4$–$t_5$. Thereafter, during the clearing operation of a line $a_{n+2}$, a drive clock pulse $\phi_V$ is supplied to the vertical shift register 15S, whereby the switching transistors 15N of the 2nd row of the frame memory 15 are turned on, and the signals of the cells 10N of the 2nd row of the photoelectric conversion unit 10 are transferred to the capacitors 15M of the 2nd row of the frame memory 15. In this manner the clearing scanning and the memory scanning are conducted alternately.

Figure 7C:
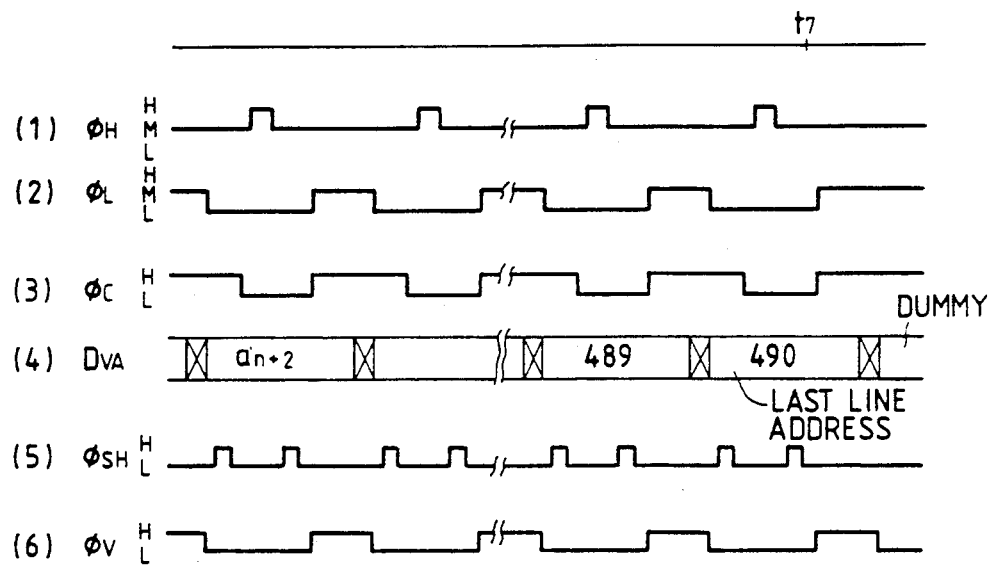

FIG. 7C shows the timing of a state in which the clearing scanning has been completed and the signal transfer to the memory alone is conducted. In order to maintain a constant accumulating time for every line, the scanning speed in the signal transfer to the memory is made equal to that in the clearing scanning. The memory scanning operation ends at $t_7$.

Figure 7D:
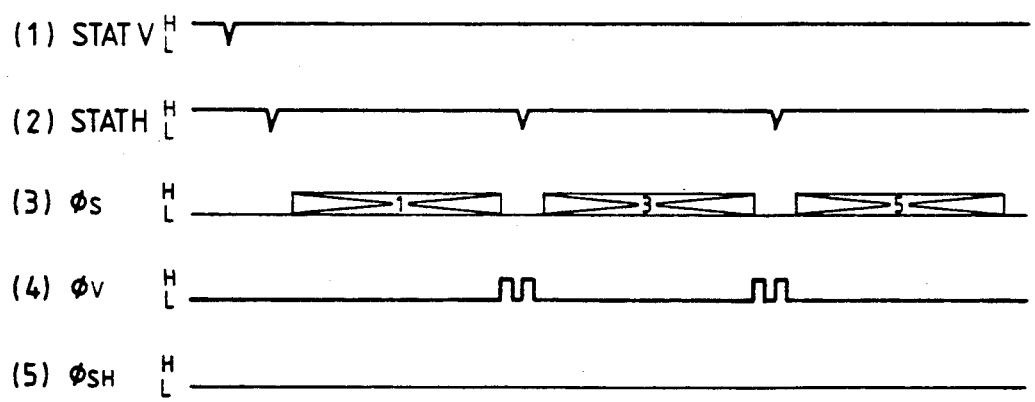

FIG. 7D shows the timing of the signal readout scanning of an odd field. In response to a STATV pulse, the vertical shift register 15S is reset to enable the readout of the signals of the capacitors 15M of the 1st row of the frame memory 15. Then, said signals are released in succession from the output terminal 26, in response to the STATH pulse and drive pulses $\phi_S$ supplied to the horizontal readout shift register 20. Then, two drive pulses $\phi_V$ are supplied to the vertical shift register 15S to enable the readout of the signals of the 3rd row of the frame memory 15, and said signals are read in succession by the horizontal readout shift register 20. In this manner the signals stored in the odd rows of the frame memory 15 are read and released from the output terminal 26.

Figure 7E:
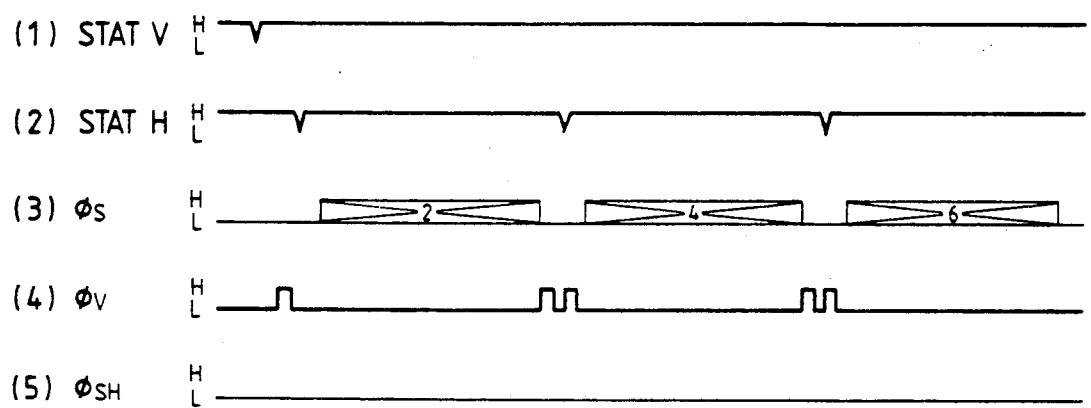

FIG. 7E shows the timing of signal readout of an even field. After the resetting of the vertical shift register 15S by the STATV pulse, a pulse $\phi_V$ is supplied for addressing the signals of the 2nd row of the frame memory 15. In this state said signals are read in succession in the horizontal direction and are released from the output terminal 26, by the STATH pulse and drive pulses $\phi_S$ supplied to the horizontal readout shift register 20. Then, two drive pulses $\phi_V$ are supplied to the vertical shift register 15S to enable the readout of the signals of the 4th row of the frame memory 15, and said signals are read in succession by the horizontal readout shift register 20. In this manner the signals stored in the even rows of the frame memory 15 are read and released from the output terminal 26.

During the readout of the odd and even fields, the signal $\phi_{SH}$ is maintained at the L-level, whereby the photoelectric conversion unit 10 is separated from the frame memory 15 so that the signals stored in the frame memory 15 are not affected by the light incident on the photoelectric conversion unit 10. Also, since the buffer 24 is of a high input impedance, the signal readout from the frame memory 15 can be repeated in a non-destructive manner.

FIG. 8 is a block diagram of an example of an image recording apparatus utilizing the solid-state image pickup device shown in FIG. 5. In FIG. 8 there are shown a photographing lens 110; a diaphragm 112; a photometric sensor 113; a solid-state image pickup device 114 shown in FIG. 5; a video signal processing circuit 116 for converting the output of said image pickup device 114 into a video signal; a monitor circuit 118; an image monitor 120; a frequency modulating (FM) circuit 122; a recording amplifier 124; a recording gate circuit 126 with two signal lines, equipped with an odd field switch 126A and an even field switch 126B; a magnetic head 128 for signal recording on an odd field track; a magnetic head 130 for signal recording on an even field track; a magnetic sheet 132 constituting an image recording medium; a motor 134 for rotating said magnetic sheet 132; a motor drive circuit 136 for controlling said motor 134; a system control circuit 138 for controlling the entire system; a power supply switch 140; a recording switch 142 for activating the recording operation; a power supply circuit 144; a clock generator 146 for generating a clock signal required in various units of the system; a drive circuit 148 for driving the image pickup device 114; and a diaphragm drive circuit 150 for driving the diaphragm 112. The switches 140 and 142 are respectively closed in first and second strokes of a shutter release button. A motor servo lock signal 152 indicates that the rotation of the motor 134 is stabilized.

FIG. 9 shows the timing of the operation of the circuit shown in FIG. 8. In the present embodiment, the shutter releasing operation (closing of the switch 142) can be conducted before the rotation of the motor 134 is stabilized. In response to the closing of the switch 140 at a time $t_0$ by the shutter releasing operation, the electric power is supplied to the system to activate the image pickup device 114. Until the switch 142 is closed at a time $t_1$, the image pickup device 114 is driven in the movie mode, wherein the photographed image is displayed on the monitor 120 and light metering is conducted by the sensor 113. When the switch 142 is closed at the time $t_1$, the diaphragm stop value and the charge accumulating time of the image pickup device 114 are fixed based on the result of light metering, and the image pickup device 114 is shifted to the still mode. If the rotation of the motor 136 is not stabilized at the termination of the clearing scanning and the signal transfer to the frame memory, the signal $\phi_{SH}$ remains at the L-level so that the readout operation of the frame memory 15 is not conducted and the system enters a stand-by state. When the motor servo lock signal 152 is shifted to the H-level by the stabilization of rotation of the motor 136 (time $t_3$), the signal readout of the odd field is conducted and the gate switch 126A is simultaneously closed to record the signals on the magnetic sheet 132. Then the signal readout of the even field is conducted in a period $t_4$–$t_5$ and the gate switch 126B is simultaneously closed to record the signals on the magnetic sheet 132.

In the present embodiment, the clearing scanning and the memory scanning are conducted in the interlace mode, so that there is no time difference of 1/60 seconds even between the mutually neighboring lines of odd and even fields. More specifically the charge accumulating time in the image pickup device 114 is gradually displaced in the vertical direction, as in the vertically running focal plane shutter in a conventional still camera. It is therefore possible to obtain a still image without blur, even in a moving object. Also, the photographed still image is stored in the light-shielded frame memory 15 which is electrically insulated from the photoelectric conversion unit 10, so that the image taking operation can be conducted without awaiting the stabilization of rotation of the motor 134, and the delay in the shutter releasing operation can be avoided. Also, the clearing scanning of the photoelectric conversion unit 10 and the signal transfer to the memory need not be conducted within a horizontal scanning period as in the conventional technology but can be made faster up to about 5 microseconds per line. The time corresponding to the running time of the focal plane shutter is about 5 $\mu s \times 500$ lines $\leq 2.5$ ms, and is about equal to or less than that in the mechanical shutters. Consequently, the deformation of a moving object can be made about the same as or less than that using mechanical shutters.

Figure 10:
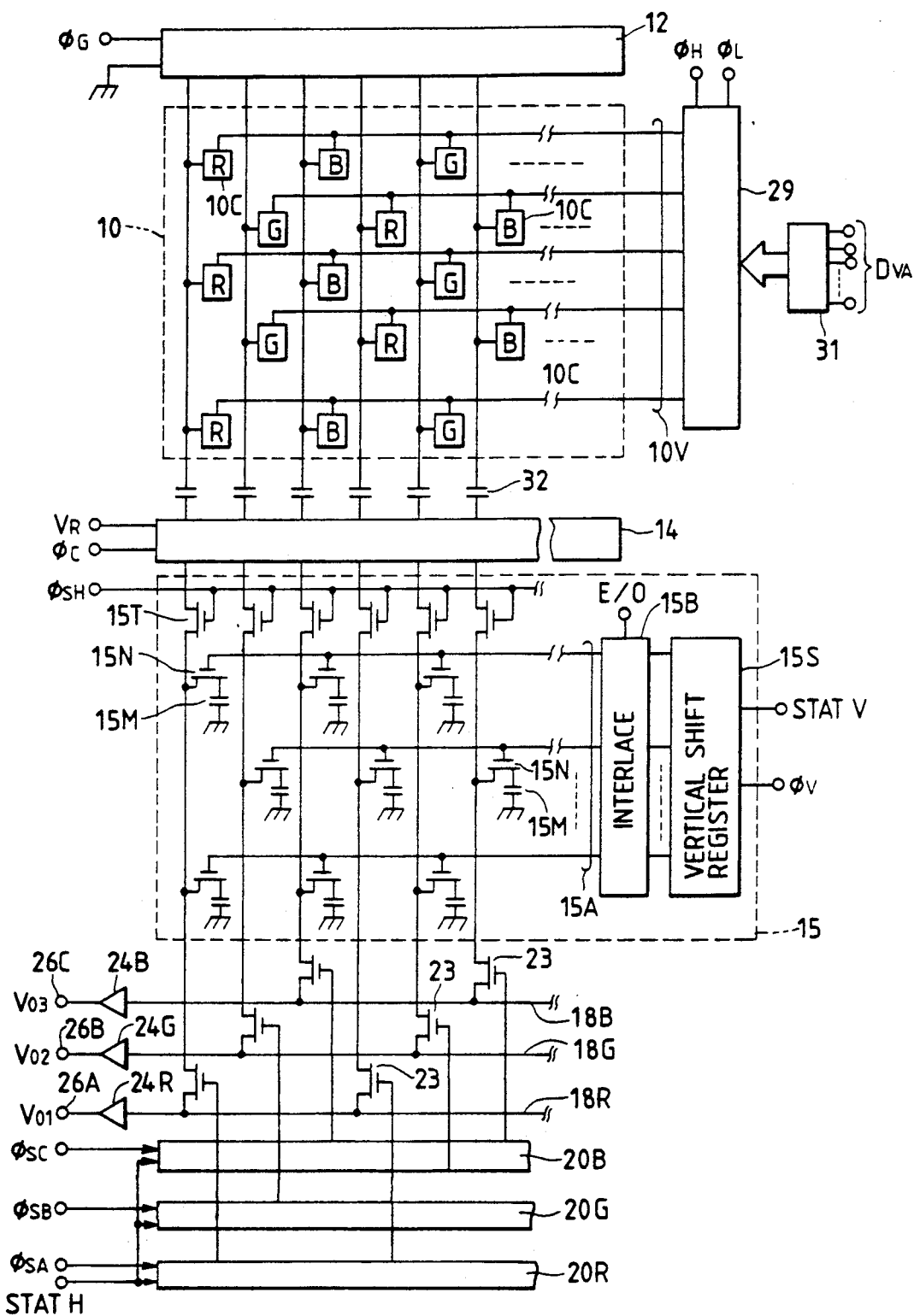
FIG. 10 is a block diagram of a second embodiment of the present invention.
Figure 11:
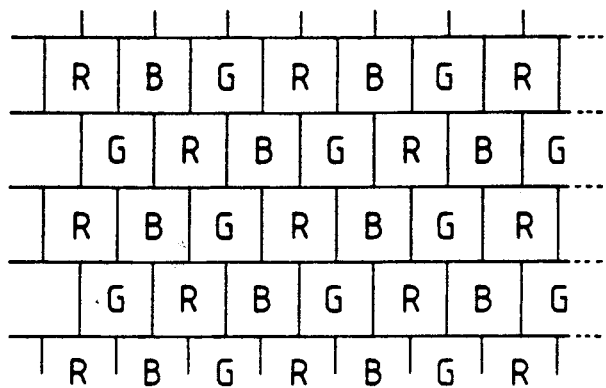
FIG. 11 is a view showing the arrangement of a color filter shown in FIG. 10.

FIG. 10 is a block diagram of a second embodiment of the present invention, suitable for color image taking. In the present embodiment, the photoelectric conversion cells 10C in each horizontal line are displaced by 180° with respect to those in the adjacent line, and are provided with color filters of an arrangement as shown in FIG. 11, wherein R, G and B respectively indicate red, green and blue filters. The memory capacitors 15M of the frame memory 15 are arranged corresponding to the photoelectric conversion cells 10C. An interlace circuit 15B is provided for switching the output of the vertical shift register 15C in the scanning of an odd field (O) or an even field (E). An L- or H-level signal is supplied to the control terminal E/O of the interlace circuit 15B respectively when an odd field or an even field is selected. In the present embodiment, the number of output lines of the vertical shift register 15S can be reduced to half in comparison with that in the circuit shown in FIG. 5.

For reading the photoelectrically converted signals of respective colors, there are provided three circuits. Output signal lines 18R, 18G, 18B are for respectively reading signals of R, G, B stored in the designated rows of the frame memory 15. There are further provided horizontal readout shift registers 20R, 20G, 20B for designating the signals to be read from the frame memory 15; switches 23 controlled by the outputs of said shift registers 20R, 20G, 20B; output buffers 24R, 24G, 24B; and output terminals 26R, 26G, 26B. The shift registers 20R, 20G, 20B are activated by a start pulse STATH, and receive shift pulses $\phi_{SA}$, $\phi_{SB}$, $\phi_{SC}$.

There are also provided an address decoder 29 for simultaneously activating two adjacent ones of the vertical address lines 10V of the photoelectric conversion unit 10; and a decoder drive circuit 31 for designated the vertical address lines to be activated by the address decoder 29, according to the vertical address data $D_{VA}$. Said vertical address data $D_{VA}$ are for example of 9 bits, of which the first bits indicate an odd field or an even field, and the remaining 8 bits designate the vertical address. The address decoder 29, as will be explained later in detail, sends a readout clock signal $\phi_H$ to two vertical address lines 10V determined by the above-mentioned vertical address and the odd/even signal from the decoder drive circuit 30, and sends a clock signal $\phi_L$ to other vertical address lines. Thus the readout clock signal is supplied simultaneously to two vertical address lines 10V, for example to the first and second rows or third and fourth rows in case of an odd field, or to the second and third rows, or the fourth and fifth rows in case of an even field.

Also, the interlace circuit 15B simultaneously activates two vertical address lines 15A, like the address decoder 29 in the odd or even field.

Figure 12:
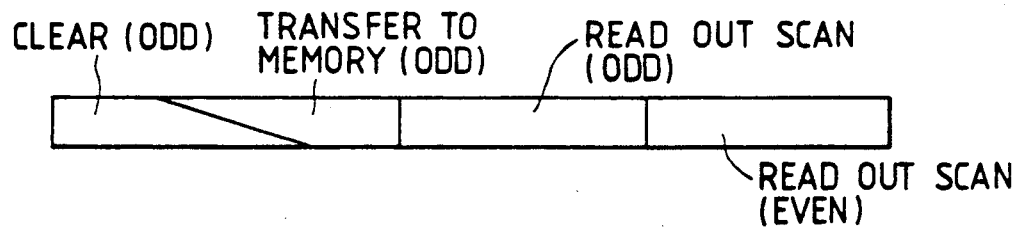
FIG. 12 is a timing chart of the operation of the image pickup device shown in FIG. 10.

FIG. 12 shows the sequence in the case of driving the image pickup device of FIG. 10 in the still mode. Since two adjacent rows of the photoelectric conversion cells 10C are simultaneously activated as explained above, the clearing scanning and the transfer to the memory are conducted by two rows at a time. FIG. 12 shows the clearing scanning and the signal transfer to the memory in the odd field mode. The clearing scanning and the signal transfer to the memory, being conducted two rows at a time, are completed with a half of the time required in comparison with the case of FIG. 6. After said signal transfer, there is conducted readout from the frame memory 15, in the order of an odd field and an even field.

Figure 13A:
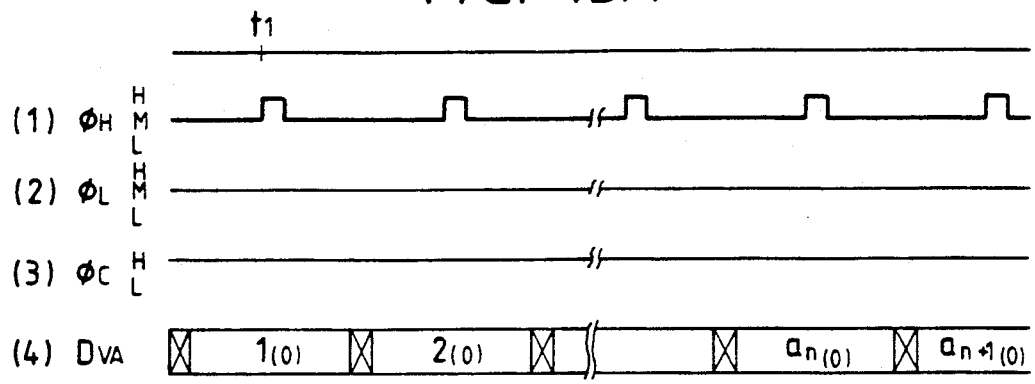
FIGS. 13A, 13B, 13C, 13D and 13E are more detailed timing charts.

FIG. 13A shows the timing of the driving around the start of the clearing scanning operation. The timing is same the as that shown in FIG. 7A, except that two adjacent rows are simultaneously cleared. The suffix (0) attached to the line numbers of the address $D_{VA}$ indicates the odd field mode.

Figure 13B:
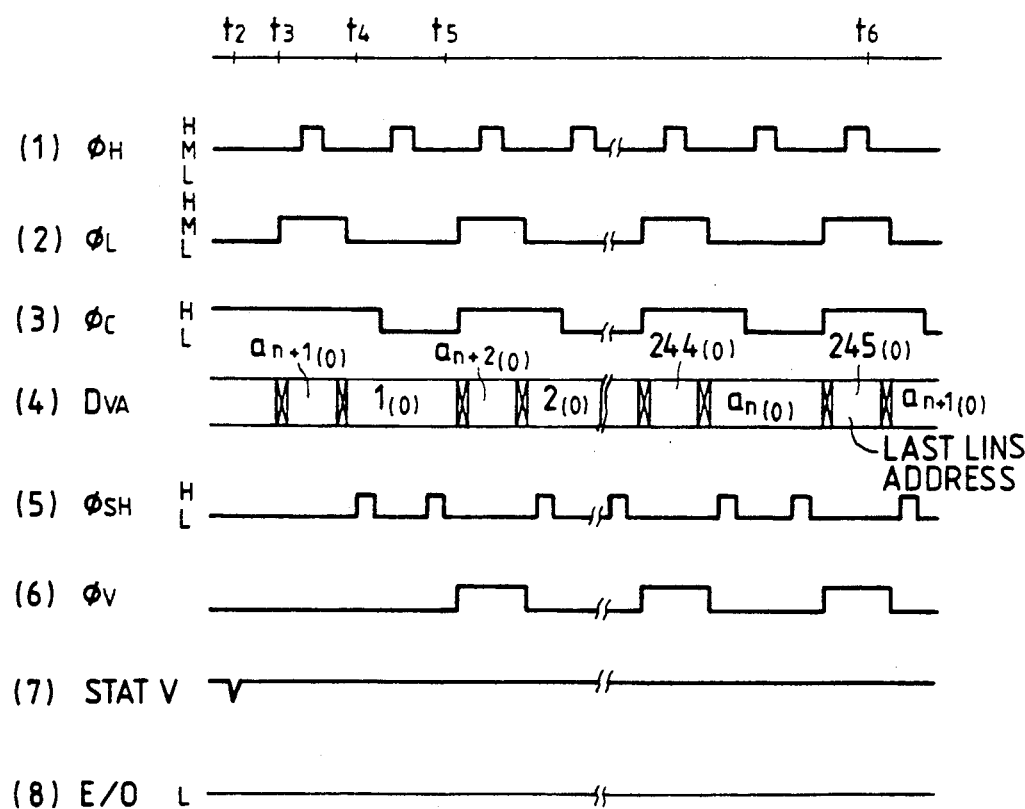
Figure 13C:
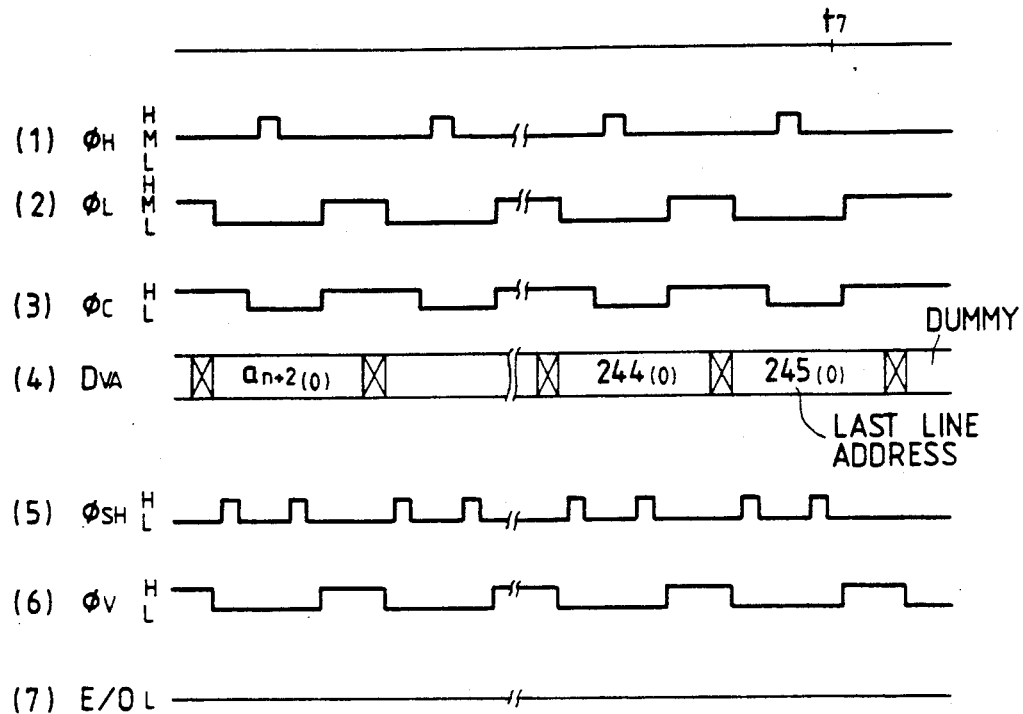
Figure 13D:
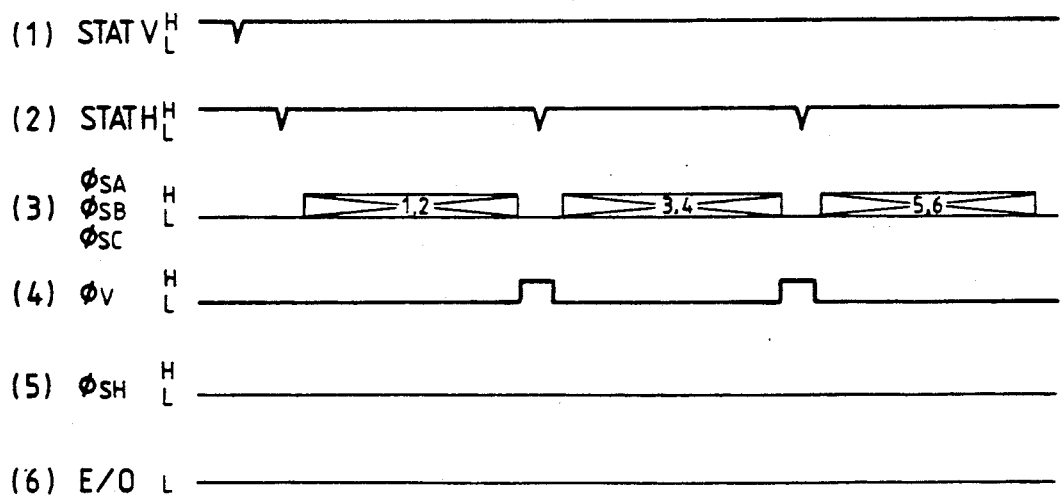

FIG. 13B shows the timing of the driving around the start of the signal transfer to the memory and around the end of the clearing scanning. In order to scan the frame memory 15 in the odd field mode, an L-level signal is set at the control terminal E/O of the interlace circuit 15B. The memory scanning is also conducted two rows at a time. FIG. 13C shows the timing of the driving around the end of the memory scanning operation, while FIG. 13D shows the timing of a readout scanning of an odd field from the frame memory 15. In FIG. 13D, the signals of two rows of the frame memory 15, for example the 1st and 2nd rows, or the 3rd and 4th rows, are released in three different signals corresponding to R, G and B. The signal $\phi_V$ is supplied only once during a horizontal scanning period, different from the mode shown in FIG. 7D. An L-level signal is set at the control terminal E/O of the interlace circuit 15B.

Figure 13E:
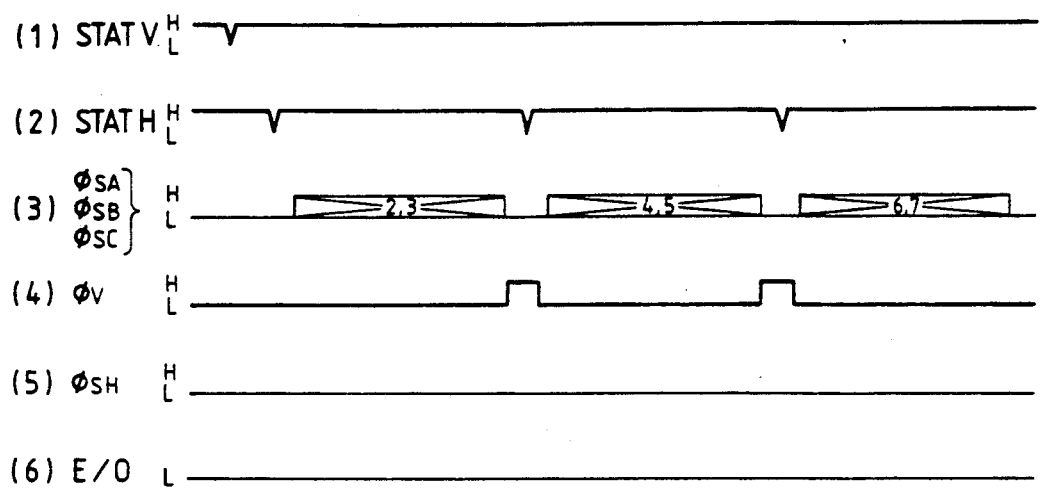

FIG. 13E shows the timing of the driving in the readout operation of the frame memory 15 for an even field. An H-level signal is set at the control terminal E/O of the interlace circuit 15B, whereby signals are read from two rows at a time, for example the 2nd and 3rd rows, or the 4th and 5th rows.

Figure 14:
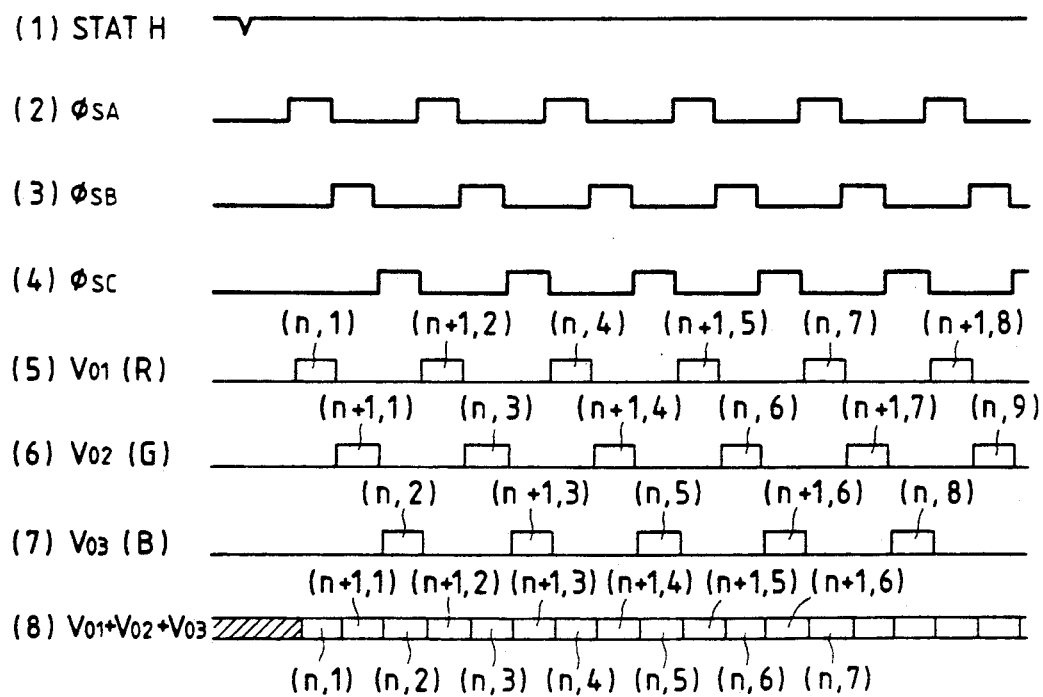
FIG. 14 is a timing chart of the horizontal scanning of the circuit shown in FIG. 10.
Figure 15A:
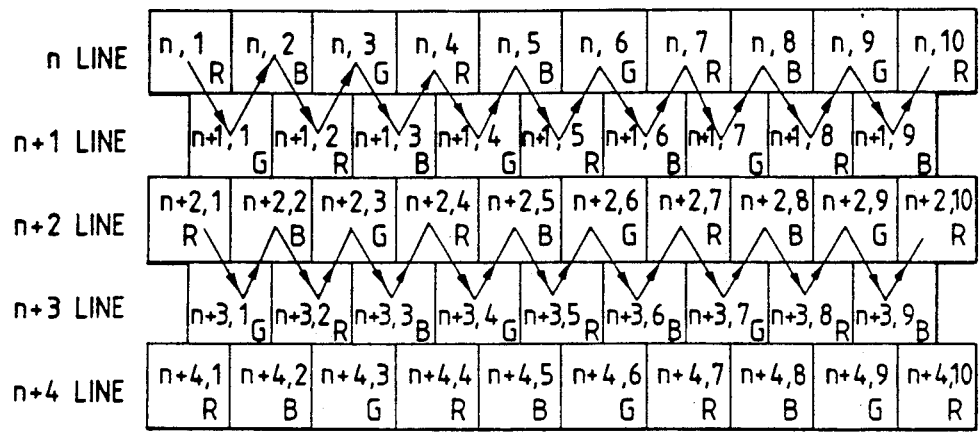
FIGS. 15A and 15B are views showing the sequence of scanning of a luminance signal in the image pickup device shown in FIG. 10.
Figure 15B:
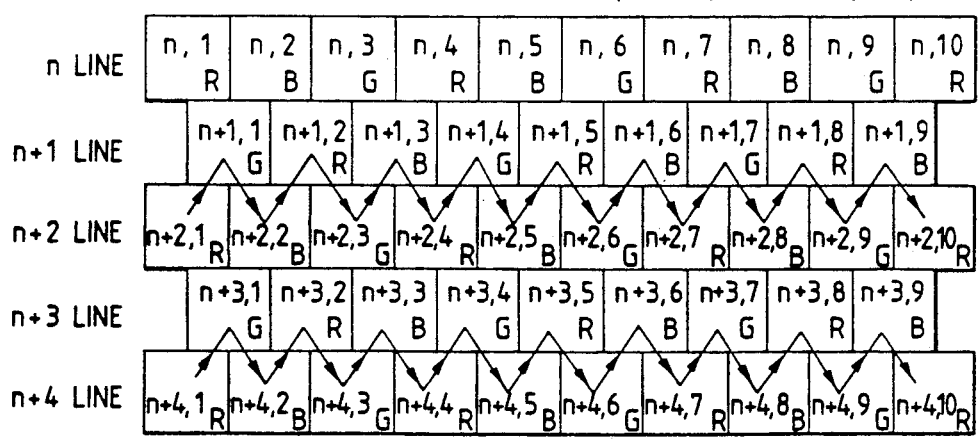

FIG. 14 shows the timing of the driving around the start of horizontal scanning. After the supply of the start pulse STATH, the shift registers 20R, 20G, 20B respectively receive the shift pulses $\phi_{SA}$, $\phi_{SB}$, $\phi_{SC}$ with respective phase difference of 120°, whereby the FET's 23 are turned on with a ⅓ duty cycle. Let us consider a case in which the n-th and (n+1)-th rows are read with outputs (n, m). The signals of two lines are divided, in the timing shown in FIG. 14, to the output terminals 26A, 26B, 26C (voltages V01, V02, V03). By multiplexing said voltages, there can be obtained a luminance signal of a wide band, of which horizontal resolution is doubled due to the staggered arrangement of the pixels. FIG. 15 shows the sequence of scanning of the luminance signal. Because the data stored in the frame memory 15 are non destructive, there can be obtained luminance signal of a wide band, utilizing the data of all the pixels, both in the odd and even fields.

In the still image recording with a single field, the recording is often conducted by adding the signals of adjacent two rows in the image pickup device, so that the sensitivity of such field recording is different from that of the frame recording in which both fields are recorded. Consequently, it has therefore been necessary to regulate the exposure constants or the signal gain between the field recording and the frame recording, but such regulation is unnecessary in the present embodiment, since the sensitivity is same in both recordings.

In the following there will be explained the driving of the image pickup device shown in FIG. 10 in the movie mode. After the start of power supply, the vertical shift register 15S is reset by the start pulse STATV, whereby the 1st and 2nd rows of the frame memory 15 are addressed. The drive clock signals $\phi_V$ are not supplied in order to utilize the frame memory 15 as the line memory. The line memory is composed of the 1st and 2nd rows, or the 2nd and 3rd rows, respectively by setting an L-level signal or an H-level signal at the control terminal E/O of the interlace circuit 15B. The function is same in both cases. The function in the movie mode can be achieved in this state as in the drive shown in FIG. 4. However, the readout line address $D_{VA}$ is switched at every field to simultaneously read the signals of two rows, displaced by a row for every field, thereby obtaining an interlaced image.

The present embodiment produces a still frame image of a high resolution of about 480 TV lines in the horizontal direction and 350 lines in the vertical direction, by means of an image pickup device of a relatively limited number of pixels, such as 600 and 500 pixels respectively in the horizontal and vertical directions. Also, since the field recording and the frame recording can be made with the same sensitivity, it is no longer necessary to switch the constants of the photometric system or the exposure system or to vary the gain of the signal processing system, and the circuit structure can be simplified. Furthermore, since the clearing scanning and the signal transfer to the memory are conducted by two rows at a time, the time corresponding to the running time of a focal plane shutter is further reduced to $\frac{1}{2}$ in comparison with the embodiment shown in FIG. 5, so that the deformation of a fast-moving object is further reduced.

As will be easily understood from the foregoing, the 1st and 2nd embodiments of the present invention produces a still frame image without blur, even in the case of a moving object. Also, in the application in an electronic still camera, the time lag in the shutter releasing operation can be substantially avoided, since the photographing operation can be effected without awaiting the stabilization of rotation of the motor for rotating the recording medium, and the photographed image can be stored in the frame memory of the image pickup device.

Figure 16:
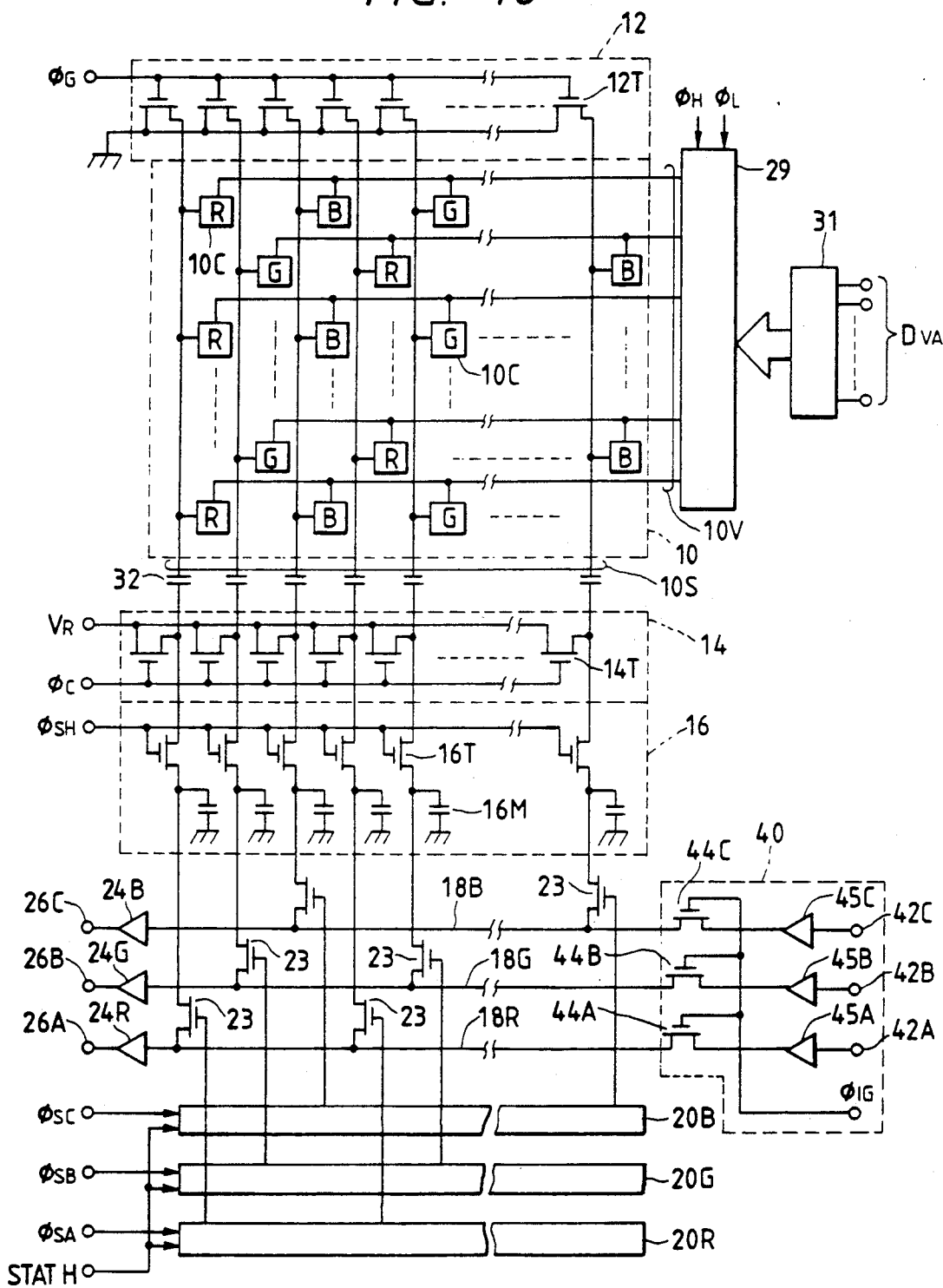
FIG. 16 is a block diagram of an embodiment of the present invention.

FIG. 16 shows a third embodiment of the present invention, which is different from the second embodiment shown in FIG. 10 in the presence of an input unit 40 and in the use of a line memory 16 instead of the frame memory 15.

The input unit 40, represented by a broken-lined block, is provided with external input terminals 42A, 42B, 42C; gate FET's 44A, 44B, 44C; input buffers 45A, 45B, 45C; and control signals $\phi_{IG}$ for controlling said FET's 44A, 44B, 44C. Said signal $\phi_{IG}$ is at the L-level in the photographing operation.

Figure 17:
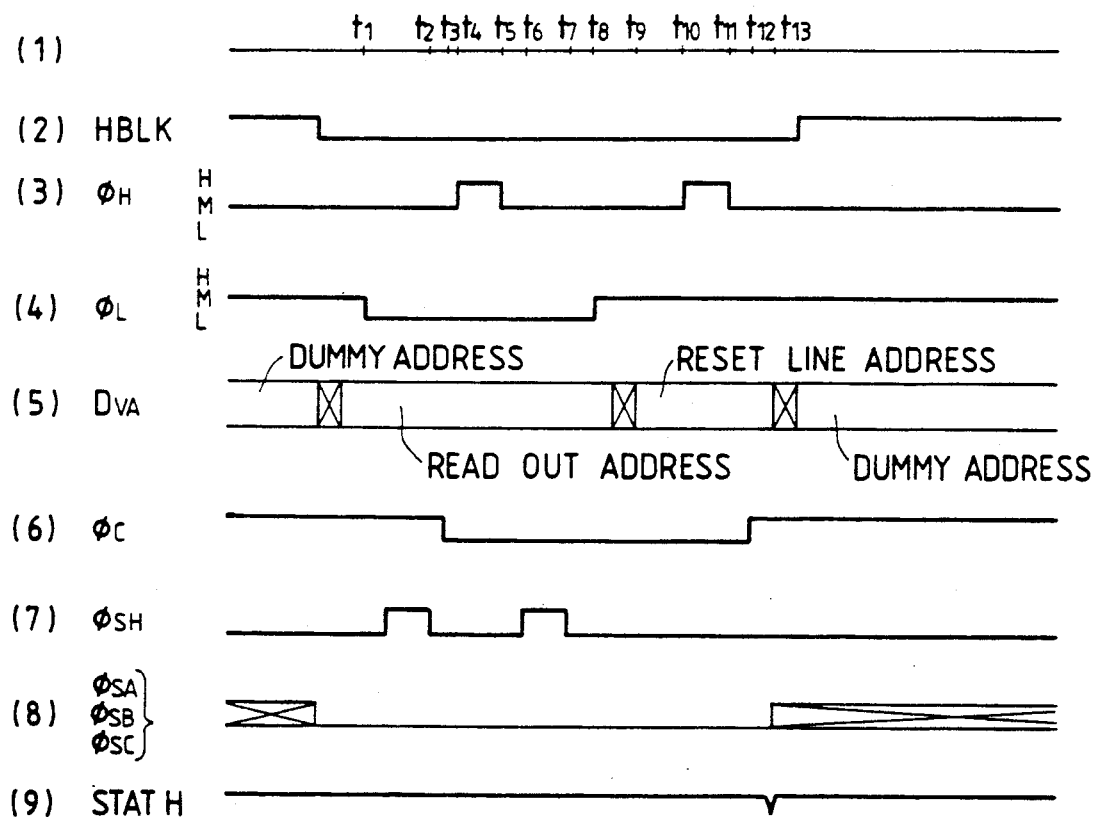
FIG. 17 is a timing chart of the image taking operation in the embodiment shown in FIG. 16.

FIG. 17 shows the timing of a photographing operation of the image pickup device shown in FIG. 16. A horizontal blanking period is started by a horizontal blanking signal HBLK, and the vertical address $D_{VA}$ is supplied to the decoder driver circuit 31 at a time $t_1$, whereby the clock signal $\phi_H$ is supplied in succession to two designated vertical address lines 10V, while the clock signal $\phi_L$ is supplied to other vertical address lines 10V. When the clock signal $\phi_L$ is shifted to the L-level at a time $t_1$, all the FET's 36 of the related photoelectric conversion cells 10C are turned off, so that only the signals of the photoelectric conversion cells 10C connected to the designated two vertical address lines 10V are supplied to the signal readout line 10S. In a period $t_1$-$t_2$, the clamping pulse $\phi_C$ is at the H-level, and the sample-hold pulse $\phi_{SH}$ is at the H-level, so that the capacitors 16M of the line memory 16 are reset to the reference potential $V_0$. The clamping FET's 14T are turned off at $t_3$. When the clock signal $\phi_H$ is shifted to the H-level in a period $t_4$-$t_5$, the capacitors 38 are precharged, and the voltages across the coupling capacitors 32 are proportional to the amount of charge generated by the photo-induced voltages in the photoelectric conversion cells 10C. Said voltages of the coupling voltages 32 are transferred to and stored in the capacitors 16M by the H-level state of the signal $\phi_{SH}$ in a period $t_6$-$t_7$.

A resetting operation for controlling the accumulating time is conducted in a period $t_9$-$t_{11}$. In the present embodiment, since two vertical address lines 10V are simultaneously activated, the resetting is also simultaneously conducted on said two lines. The addresses of the vertical lines to be reset are set at $t_9$, and the charges of the designated lines are reset in a period $t_{10}$-$t_{11}$. The charge accumulation is conducted from the resetting operation to the next signal readout from said lines. After $t_{12}$, the horizontal shift registers 20R, 20G, 20B are driven by shift pulses $\phi_{SA}$, $\phi_{SB}$, $\phi_{SC}$ whereby the signals stored in the capacitors 16M are transferred to the output lines 18R, 18G, 18B and released to the output terminals 26A, 26B, 26C, respectively through the buffers 24R, 24G, 24B.

Figure 18:
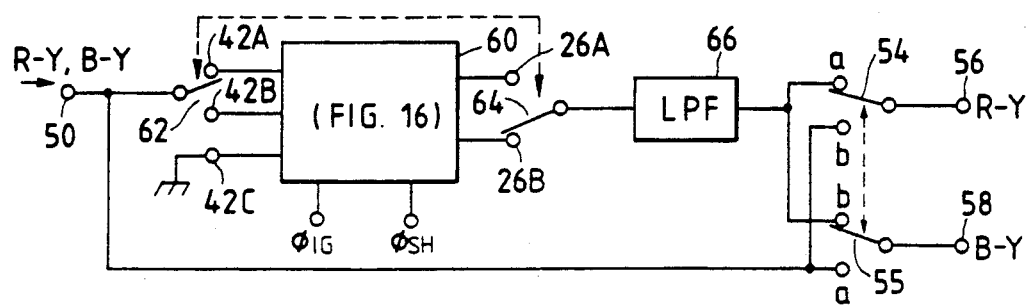
FIG. 18 is a circuit diagram in which the image pickup device shown in FIG. 16 is utilized as a delay device for converting line-sequential color difference signals into line-parallel signals.

In the following there will be explained the method of utilizing the line memory 16 by means of the additional circuit 40. For example in a still video floppy disk used as the recording medium in an electronic still camera, the color difference signal is recorded as a line sequential signal, which is converted, in the reproducing system, into a line parallel signal by a converting circuit. FIG. 18 shows a fourth embodiment for such a system, wherein provided are an input terminal 50 for the line sequential color difference signal; mutually linked switches 54, 55; an output terminal 56 for a R-Y signal; and an output terminal 58 for a B-Y signal. Said switches 54, 55 are simultaneously connected to contacts a, or contacts b.

There are further shown an image pickup device 60 the same as that shown in FIG. 16; a switch 62 switchable between external input terminals 42A, 428 of the image pickup device 60; and another switch 64 switchable between output terminals 26A, 26B of the image pickup device 60. Said switches 62, 64 are shifted at every horizontal scanning line, and, when the switch 62 is connected to the input terminal 42A or 42B, the switch 64 is respectively connected to the output terminal 26B or 26A. An external input terminal 42C is not used in the present embodiment and is grounded. A low-pass filter 66 is provided for eliminating the clock noise.

For using the line memory 16 as a 1H delay line, the signal $\phi_{SH}$ is maintained at the L-level to exclude the influence from the clamping circuit 14, and the gate signal $\phi_{IG}$ is shifted to the H-level to turn on the FET's 44A, 44B, 44C. In the image pickup device 60, the signals on the output signal lines 18R, 8G, 18B are sampled by the shift registers 20R, 20G, 20B and stored in the line memory 16, and the signals stored in the line memory 16 are released in succession to the corresponding output signal lines 18R, 18G, 18B by means of the shift registers 20R, 20G, 20B. When the switch 62 is connected to the external input terminal 42A for the n-th horizontal line, the signal of the n-th horizontal line supplied to the input terminal 50 is stored in the capacitors 16M for the red signal. In this state, the switch 64 is connected to the output terminal 26B, whereby the signals of the preceding horizontal line, stored in the capacitors 16M for the green signal is read and supplied to the low-pass filter 66. For the (n+1)-th line, the switch 62 is connected to the external input terminal 42B while the switch 64 is connected to the output terminal 26A, so that the signals of (n+1)-th line supplied from the input terminal 50 are stored in the capacitors 16M for the green signals, and the signals of n-th line are read and supplied to the low-pass filter 66 through the switch 64.

Thus, the image pickup device 60 functions as a 1H delay device, and the line-sequential color difference signals entered from the input terminal 50 are released as line-parallel color difference signals R-Y, B-Y by the switching operations of the switches 54, 55 in synchronization with the horizontal synchronization signal.

Figure 19:
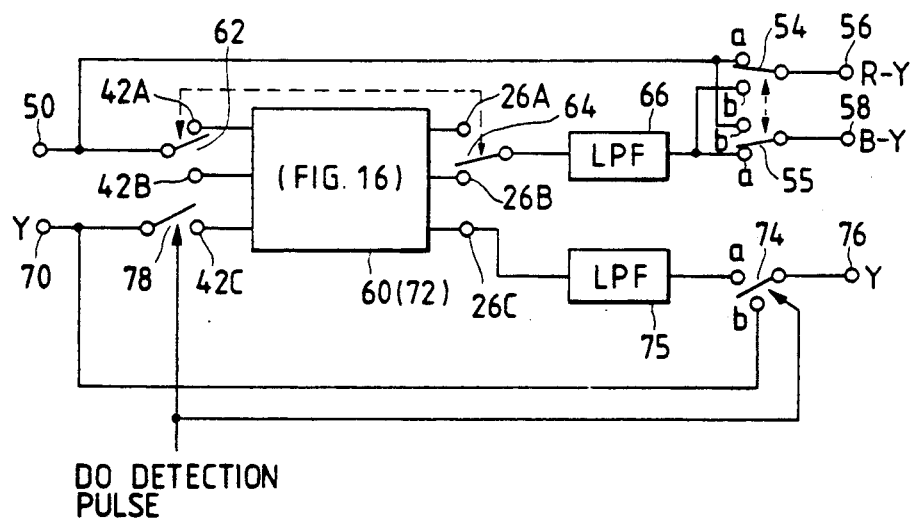
FIG. 19 is a circuit diagram in which the image pickup device shown in FIG. 16 is utilized as a delay device for dropout compensation.

FIG. 19 shows a fifth embodiment of the present invention, comprising a dropout compensating circuit in addition to the circuit shown in FIG. 18.

There are provided a switch 74 to be connected to a contact a, in case of a dropout, in response to a dropout detection pulse; and an output terminal 76. In case of a dropout, the switch 74 is connected to the contact a whereby the signals of a preceding line are released from the output terminal 76. A normally closed switch 78 is opened in response to the dropout detection pulse. A low-pass filter 75 is provided for eliminating the clock noise generated in the line memory 16 of the image pickup device shown in FIG. 16. The luminance signal entered from an input terminal 70 is supplied, through the switch 78, to the external input terminal 42C of the image pickup device shown in FIG. 16, and the output signal of the output terminal 26C thereof is supplied through the low-pass filter 80 to the contact a of the switch 74.

Referring to FIG. 19, in the normal state, the switch 78 is closed and the switch 74 is connected to the contact b. Thus, the luminance signal entered from the input terminal 70 is supplied, through the switch 78 and the external input terminal 42C, to the image pickup device 60, in which the input signals are stored in succession in the capacitor 16M for the blue signals of the line memory 16, by means of the shift register 20B. In response to the detection of a dropout, the switch 78 is opened for interrupting the renewal of the line memory 16, and the switch 74 is shifted to the contact a in order to read the signals of the preceding line from the line memory 16. As the shift register 20B indicates the stored signals of the preceding line corresponding to the timing of dropout detection, said signals are supplied, in response to the opening of the switch 78, to the output terminal 26C through the output signal line 18B and the output buffer 24B, and are released from the output terminal 76 through the low-pass filter 75 and the switch 74. When the dropout is no longer found, the switch 74 is shifted to the contact b and the switch 78 is closed whereby the content of the line memory 16 is renewed.

Figure 20:
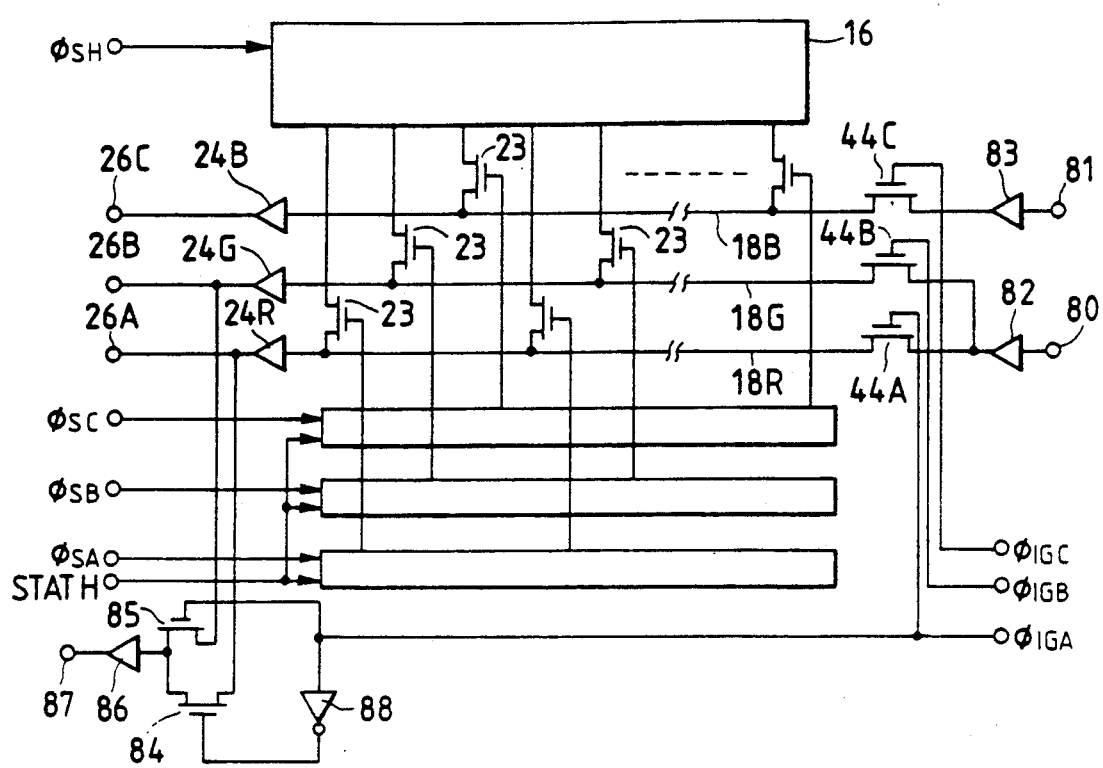
FIG. 20 is a circuit diagram of a modified embodiment in which switches 62, 64 and 78 shown in FIG. 19 are formed on the same chip.

FIG. 20 shows a sixth embodiment of the present invention, in which the switches 62, 64, 78 are functionally incorporated in the chip of the image pickup device 60. For the purpose of simplicity, there is only illustrated a portion modified from the circuit shown in FIG. 16. There are provided an external input terminal 80 for the line-sequential color difference signals; an external input terminal 81 for the luminance signals; and input buffers 82, 83. The output of the input buffer 82 is supplied to the output signal lines 18R, 18G, while that of the input buffer 83 is supplied to the output signal line 18B. There are further provided gate FET's 84, 85; an output buffer 86; an output terminal 87 for the line-sequential color difference signal of the preceding line; and an inverter 88. The operation of the switch 62 is achieved by alternately turning on the FET's 44A, 44B by control signals $\phi_{IGA}$, $\phi_{IGB}$. Also, the operation of the switch 64 can be realized by controlling the FET 85 with the control signal $\phi_{IGA}$ and controlling the FET 84 with said control signal $\phi_{IGA}$ inverted by the inverter 88. Furthermore, the operation of the switch 78 can be realized by synchronizing the control signal $\phi_{IGC}$ with the dropout detection pulse.

Figure 21:
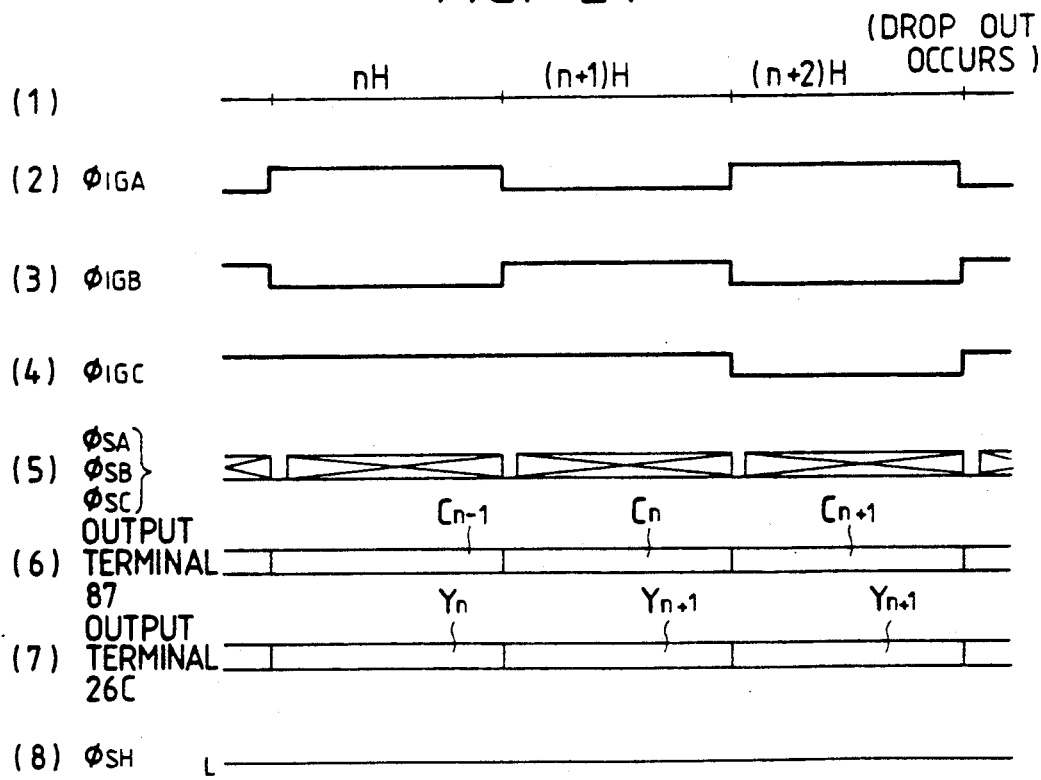
FIG. 21 is a timing chart showing the function of the circuit shown in FIG. 20.

FIG. 21 shows the timing of the operation of the circuit shown in FIG. 20. If the signal $\phi_{IGA}$ is at the H-level while the signal $\phi_{IGB}$ is at the L-level at the n-th horizontal line, there are simultaneously conducted the recording in the line memory 16 and the readout of the preceding line from the line memory 16 as already explained in relation to FIG. 18, whereby the color difference signal $C_{n-1}$ of the preceding line is released on the output signal line 18C. Since the signal $\phi_{IGA}$ is at the H-level, the FET's 85 and 84 are respectively turned on and off, whereby the signal of the output signal line 18C is released to the output terminal 87 through the output buffer 86. At the next (n−1)-th line, the signals $\phi_{IGA}$, $\phi_{IGB}$ respectively assume the L- and H-levels, whereby the signal $C_n$ stored in the line memory 16 for the n-th line is read and released to the output terminal 87.

The luminance signal supplied to the external input terminal 81 is stored in the line memory 16 and also is supplied to the output terminal 26C as already explained in relation to FIG. 19, since the signal $\phi_{IGC}$ is normally at the H-level. However, if a dropout is detected in the (n+2)-th line, the FET 44C is turned off by the signal $\phi_{IGC}$, thereby prohibiting the input to the output signal line 18B. Thus, the signal $Y_{n-1}$ of the preceding line stored in the line memory 16 is read out to the output signal line 18B and supplied to the output terminal 26C.

In the image taking operation, the line memory 16 can be used for the image signal by shifting the signals $\phi_{IGA}$, $\phi_{IGB}$ and $\phi_{IGC}$ to the L-level.

As explained in the foregoing, the image pickup device containing a line memory for transferring the image signal allows the use of said line memory as a delay line, by the addition of simple input and output means. This is a significant advantage, as the number of components in the image signal processing circuit can be reduced, and the manufacturing process can be accordingly simplified.

Figure 22:
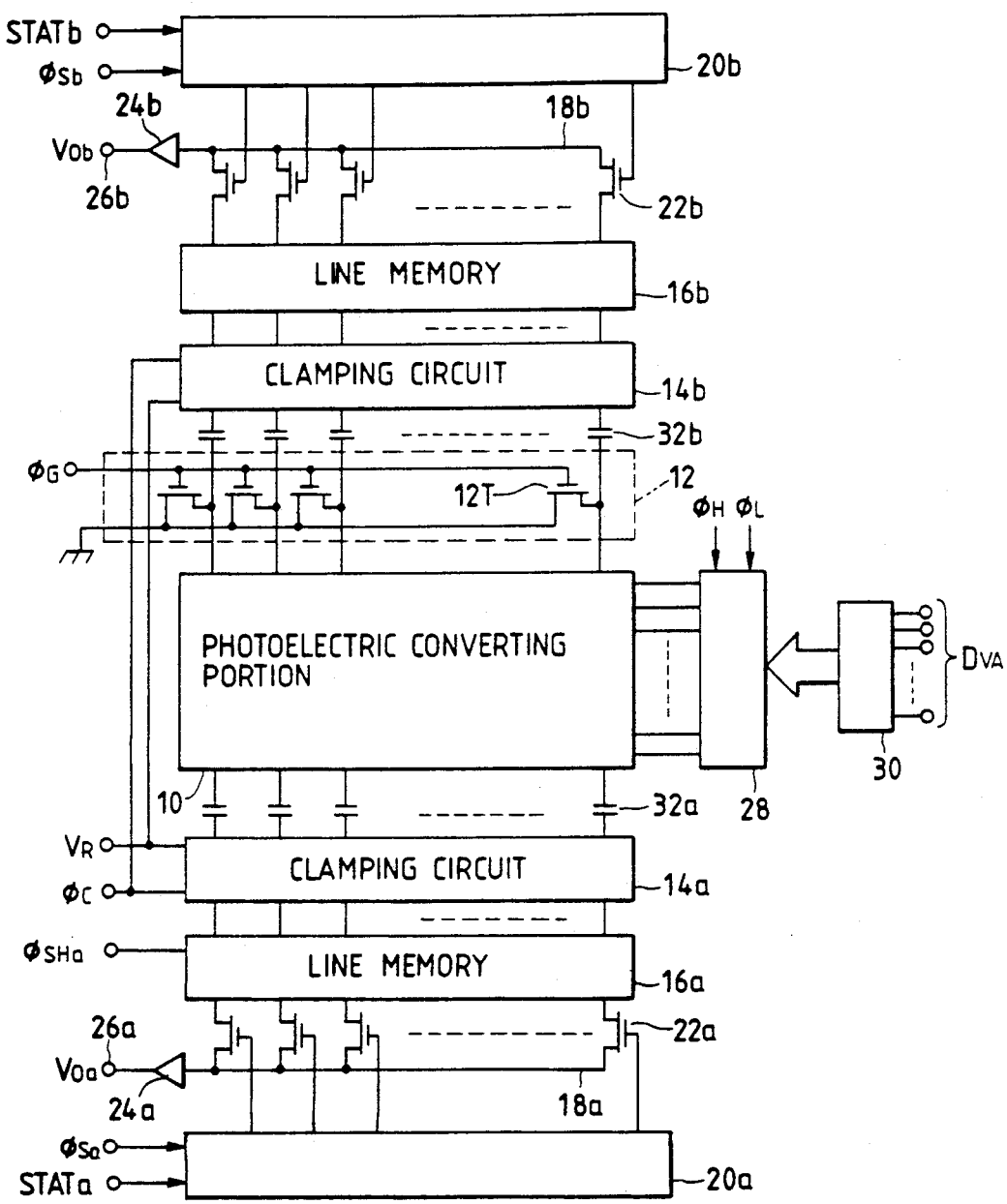
FIG. 22 is a block diagram of another embodiment of the present invention.

FIG. 22 shows an area sensor containing a second readout circuit, in addition to the conventional structure shown in FIG. 1, constituting a seventh embodiment of the present invention. Components the same as those in FIG. 1 are represented by same numbers, but suffixes a and b are respectively attached to the components of the first and second readout circuits. The added second readout circuit is identical, in structure, with the first readout circuit, and will not, therefore, be explained further. The clamping pulse $\phi_C$ and the reference voltage $V_{REF}$ are used commonly in the two readout circuits, but they may be formed independently for these two readout circuits.

Figure 23:
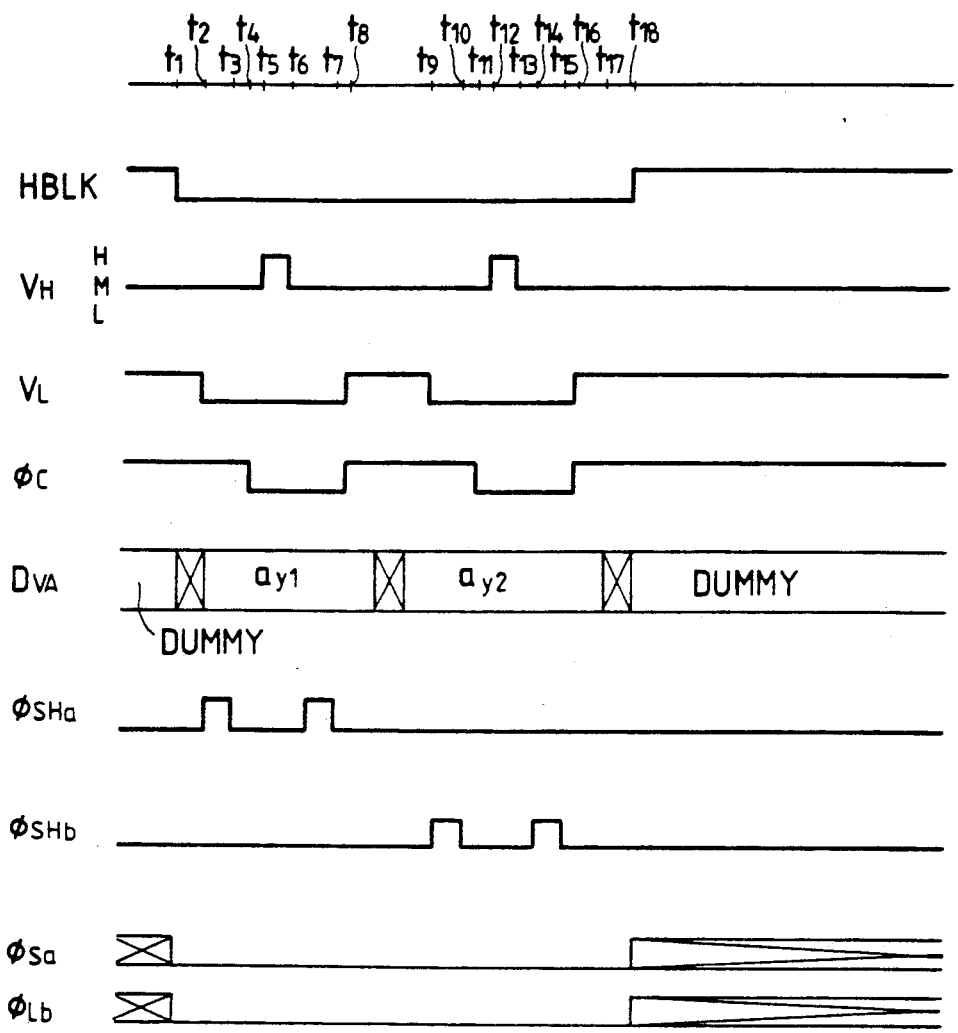
FIG. 23 is a timing chart of the function of the device shown in FIG. 22.

Now, reference is made to FIG. 23, for explaining the drive timing for reading the signals substantially simultaneously from two vertically adjacent lines of the area sensor shown in FIG. 22. The signal of a line designated by the address $a_{y1}$ is supplied to a first line memory 16a in a horizontal blanking period $t_2-t_7$, while the signal of a line designated by the address $a_{y2}$ is supplied to a second line memory 16b in a period $t_9-t_{15}$, and the shift registers 20a, 20b are scanned in the horizontal scanning period to obtain output signals $V_{01}$, $V_{0b}$. The interlaced outputs can thus be obtained by designations $a_{y1}=1, 3, 5, 7, \ldots$ and $a_{y2}=2, 4, 6, 8, \ldots$ in the first field, and designations $a_{y1}=2, 4, 6, 8, \ldots$ and $a_{y2}=1, 3, 5, 7, \ldots$ in the second field. The outputs $V_{0a}$, $V_{0b}$ in the first and second fields are summarized in Table 1.

TABLE 1

| Field | Output | Lines read |
|---|---|---|
| 1st | $V_{0a}$ | 1, 3, 5, 7, 9, . . . |
| | $V_{0b}$ | 2, 4, 6, 8, 10, . . . |
| 2nd | $V_{0a}$ | 2, 4, 6, 8, 10, . . . |
| | $V_{0b}$ | 3, 5, 7, 9, 11, . . . |

In the drive timing shown in FIG. 23, as two lines are read in succession and supplied to the line memories 16a, 16b within a horizontal blanking period, the difference in the accumulating time is about 10 μs at maximum.

Figure 24:
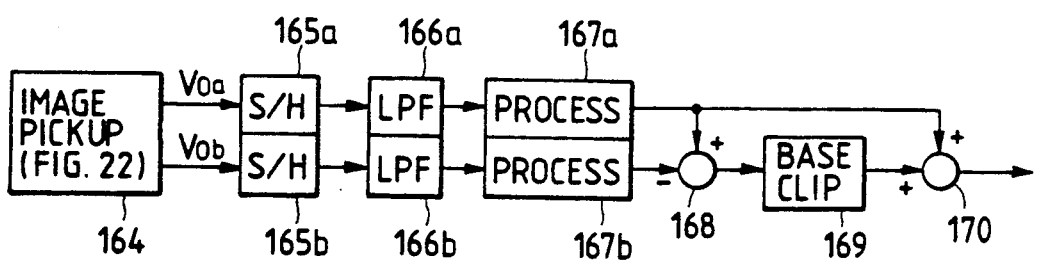
FIG. 24 is a block diagram of a vertical aperture correcting circuit shown in FIG. 23.

FIG. 24 is a block diagram of a circuit for vertical aperture correction, based on two signals from the two readout circuits of the area sensor shown in FIG. 22. Two signals $V_{0a}$, $V_{0b}$ released from the area sensor 164 shown in FIG. 22 are subjected to sample holding in sample-hold circuits 165a, 165b, then to elimination of the clock noise in low-pass filters 166a, 166b, and supplied to processing circuits 167a, 167b. The characteristics of the circuits 165a, 166a, 167a are identical with those of the circuits 165b, 166b, 167b. A subtracter 168 obtains the uncorrelated component by subtracting the output of the process circuit 167b from that of the process circuit 167a. A base clipping circuit 169 eliminates the low level noises from the output of the subtracter 168, and an adder 170 adds the output of the base clipping circuit 169 to that of the process circuit 167a. This operation corresponds to the vertical aperture correction between two neighboring lines.

Figure 25:
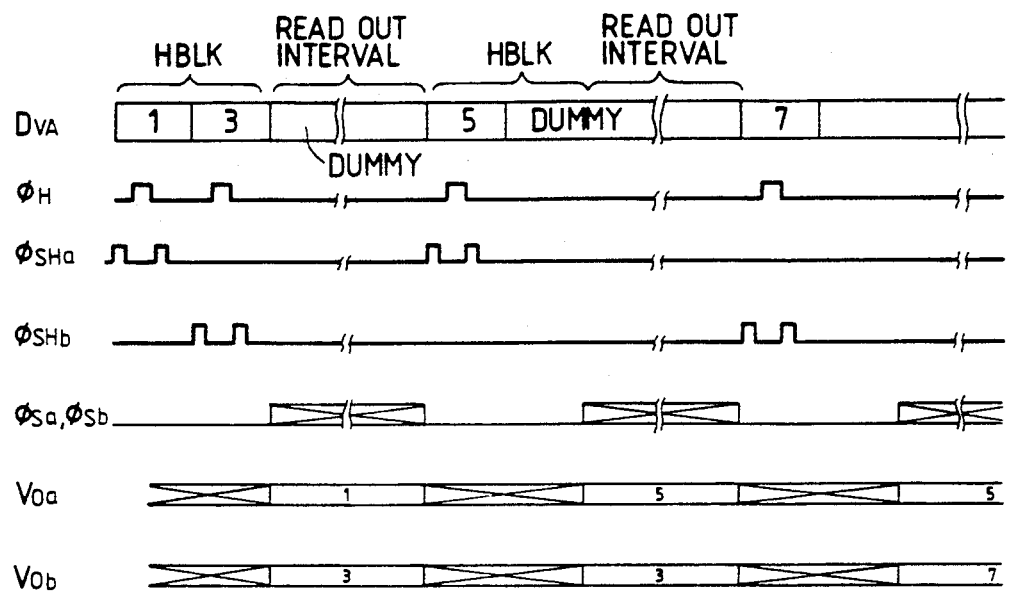
FIG. 25 is a timing chart of another function of the device shown in FIG. 23.

FIG. 25 shows another drive timing of the area sensor shown in FIG. 22. This drive method produces the signals of two lines, separated by a line therebetween in the vertical direction. In this drive method, in the 1st cycle, the signals of the 1st and 3rd lines of the area sensor are released respectively from the output terminals 26a, 26b. In the 2nd cycle, the second line memory 16b is scanned again without data renewal to again provide the signal of the 3rd line from the output terminal 26b. On the other hand, the content of the first line memory 16a is renewed by the signal of the 5th line in response to the clock signal $\phi_{SH}A$ so that the signal of said 5th line is released from the output terminal 26a. In the 3rd cycle, the first line memory 16a retains the signal of the 5th line, while the content of the second line memory 16b is renewed in response to the clock pulse $\phi_{SHB}$. Thus, the signals of the 5th and 7th lines are respectively released from the output terminals 26a, 26b. Thus, there can always be obtained the signals of two lines, separated by a line therebetween, from the output terminals 26a, 26b.

The above-explained operation applies to a first field. In a second field, there can always be obtained the signals of two even lines, such as the 2nd and 4th lines, or the 4th and 6th lines, by a change in the address data $D_{V4}$, so that an interlaced operation is enabled as shown in Table 2.

TABLE 2

| Field | Output | Lines read |
|---|---|---|
| 1st | $V_{0a}$ | 1, 5, 5, 9, 9, . . . |
| | $V_{0b}$ | 3, 3, 7, 7, 11, . . . |
| 2nd | $V_{0a}$ | 2, 6, 6, 10, 10, . . . |
| | $V_{0b}$ | 4, 4, 8, 8, 12, . . . |

In this driving method, the accumulation time for two outputs is different by about 63.5 μsec. but this difference is negligibly small in comparison with the accumulation time of 1/30 sec. for example.

Figure 26:
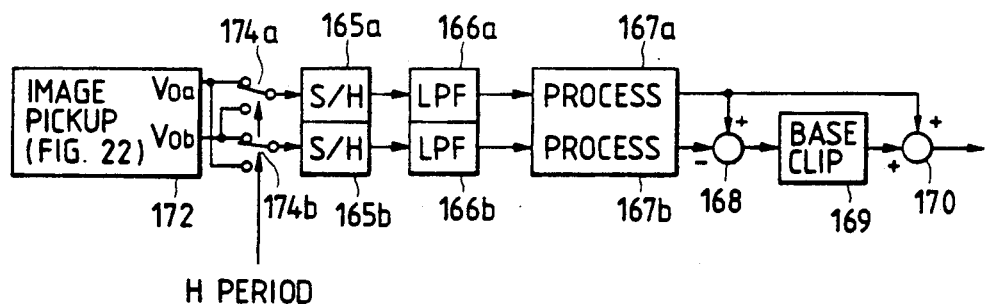
FIG. 26 is a block diagram of a vertical aperture correcting circuit for use in the function shown in FIG. 25.

FIG. 26 is a block diagram of a vertical aperture correction circuit to be employed in the driving method shown in FIG. 25. Said circuit is basically the same as the circuit shown in FIG. 24, and the same components are represented by a common number. There are provided an area sensor 172 driven with the timing shown in FIG. 25, and switches 174a, 174b which are shifted at an interval of a horizontal line, and are alternately connected to the output terminals 26a, 26b of the area sensor 172, whereby, in the first field, the sample-hold circuit 165a receives the signals of the 1st, 3rd, 5th, 7th, 9th, . . . , lines while the sample-hold circuit 165b receives the signals of the 3rd, 5th, 7th, 9th, 11th, . . . lines. In the second field, the sample-hold circuit 165a receives the signals of the 2nd, 4th, 6th, 8th, 10th, . . . lines while the sample-hold circuit 165b receives the signals of the 4th, 6th, 8th, 10th, 12th, . . . lines. It is therefore possible to separate the image output signal from the delay signal. The processing after the sample-hold circuits 165a, 165b is the same as that in the circuit shown in FIG. 24.

As explained in the foregoing, the 7th embodiment allows the reading of, substantially simultaneously, the signals of two neighboring lines or of two lines mutually separated by a line therebetween, thereby simplifying the vertical aperture correcting circuit.

FIG. 27 is a block diagram of an eighth embodiment of the present invention, wherein provided are a solid-state image pickup device 210 of a color filter arrangement as shown in FIG. 28; a CDS circuit 212 for eliminating the noise of the solid-state image pickup device 210; a clamping circuit 214; an A/D converter 216; a frame memory 218 for storing the signals of all the pixels of the image pickup device 210; a data bus 219; a digital signal processing circuit 220 for forming the luminance signal and the line-parallel color difference signals from the data stored in the frame memory 218; D/A converters 222, 224, 226; and low pass filters 228, 230, 232 for band limiting.

The following explains the basic function of the circuit shown in FIG. 27. At first the photoelectric conversion cells of the solid-state image pickup device 210 are cleared and exposed to light for a predetermined period. Then, the photoelectrically converted signals are read from all the pixels. Said signal reading may be conducted at first from the odd lines corresponding to an odd field and then from the even lines corresponding to an even field, or sequentially from all the lines. The CDS circuit 212 eliminates the noise from the output of the image pickup device 210. The obtained signal is clamped at a DC level by the clamping circuit 214, then digitized by the A/D converter 216, and stored in the frame memory 218. After the storage of the signal of a frame or a necessary amount in the frame memory 218, the digital signal processing circuit 220 reads necessary data in succession from the frame memory 218, effects the following processing, and sends the luminance signal to the A/D converter 222, color difference signal R-Y to the A/D converter 224 and color difference signal B-Y to the A/D converter 226.

FIG. 29 is a detailed block diagram of the digital signal processing circuit 220, wherein provided are latch circuits 240–247 for respectively latching the signals of Ye, Mg, Cy, G, Ye, G, Cy and Mg. For example, when the latch circuits 240-243 process an $n_e$-th line of the odd field, the latch circuits 244-247 process an $(n_o+1)$-th line. When the latch circuits 240-243 process an $n_e$-th line of the even field, the latch circuits 244-247 process an $(n_e+1)$-th line. More specifically, in an odd field, the latch circuit 240 latches the signal Ye of the k-th line; 241 latches the signal Mg of the (k+1)-th line; 242 latches the signal Cy of the k-th line; 243 latches the signal G of the (k+1)-th line; 244 latches the signal Ye of the (k+2)-th line; 245 latches the signal G of the (k+3)-th line; 246 latches the signal Cy of the (k+2)-th line, and 247 latches the signal Mg of the (k+3)-th line. In an even field, the latch circuit 240 latches Ye of the (k+2)-th line; 241 latches Mg of the (k+1)-th line; 242 latches Cy of the (k+2)-th line; 243 latches G of (k+1)-th line; 244 latches Ye of the (k+4)-th line; 245 latches G of (k+3)-th line; 246 latches Cy of the (k+4)-th line; and 247 latches Mg of the (k+3)-th line.

There are also provided adding circuits 248, 250, 252, 254; switches 256, 258 shifted at every horizontal clock signal; a white balance circuit 260 for multiplying the output of the adding circuit 248 with a coefficient in such a manner that the finally obtained color difference signal R-Y becomes equal to zero for a white area corresponding to the color temperature of the light source; a white balance circuit 262 for multiplying the output of the adding circuit 254 with a coefficient in such a manner that the color difference signal B-Y becomes zero in a similar manner; a switch 264 to be switched at every horizontal line; a subtracting circuit 266 for subtracting the output of the white balance circuit 260 from the output of the adding circuit 250; a subtracting circuit 268 for subtracting the output of the adding circuit 252 from the output of the white balance circuit 262; a gamma correction circuit 270 for the output (luminance signal) of the switch 264; a gamma correction circuit 272 for the output (color difference signal R-Y) of the subtracting circuit 266; and a gamma correction circuit 274 for the output (color difference signal B-Y) of the subtracting circuit 268.

In the following there will be explained the function of the circuit shown in FIG. 29. As explained in the foregoing, the latch circuits 240-247 latch the data stored in the frame memory 218, whereby the adding circuit 248 provides Ye+Mg; the adding circuit 250 provides Cy+G; the adding circuit 252 provides Ye+G; and the adding circuit 254 provides Cy+Mg. The output Ye+Mg of the adding circuit 248 and the output Cy G of the adding circuit 250 are obtained by adding the horizontally neighboring pixels, and the luminance signal corresponding to the $n_o$-th line in the odd field or the $n_3$-th line in the even field can be generated by shifting the switch 256 at every horizontal clock signal. Similarly the luminance signal corresponding to the $(n_o+1)$-th line in the odd field or the $(n_e+1)$-th line in the even field can be generated by alternating the outputs of the adding circuits 252, 254 at every horizontal line, by means of the switch 258. The outputs of the switches 256, 258 are alternately selected by the switch 264 at every horizontal line. The gamma correction circuit 270 applies gamma correction to the output of the switch 264, thereby providing the final digital luminance signal.

Also, the color difference signals R-Y, B-Y are respectively obtained from the outputs of the subtracting circuits 266, 268. The gamma correction circuits 272, 274 apply gamma correction respectively to the outputs of said subtracting circuits 266, 268, thereby providing digital color difference signals R-Y, B-Y.

In the following embodiment of a different color filter arrangement for the solid-state image pickup device will be explained. FIG. 30 shows a color filter arrangement often employed in video cameras, in which a line of repeating pixels of yellow (Ye) and cyan (Cy) and a line of repeating pixels of green (G) and white (W) are alternated. In this filter arrangement, in the $n_0$-th line of the odd field:

Luminance signal Y $= Y_e(k) + G(k + 1) + C_y(k) + W(k + 1)$ $= (R + G) + (G) + (G + B) + (R + G + B)$ $= 2(R + 2G + B)$ Color signals:

$R = Y_e(k) - G(k + 1)$ $B = C_y(k) - G(k + 1).$

In the $n_3$-th line of the even field:

Luminance signal Y $= G(k + 1) + Y_e(k + 2) + W(k + 1) + C_y(k + 2)$ $= 2(R + 2G + B)$ Color signals:

$R = Y_e(k + 2) - G(k + 1)$ $B = C_y(k + 2) - G(k + 1).$

For this filter arrangement, the digital signal processing circuit 220 shown in FIG. 27 may be modified as shown in FIG. 31, in which are provided latch circuits 276, 277, 278, 279 for reading and latching data stored in the frame memory 218. The latch circuit 276 latches the signal Ye of the k-th line in the odd field, or the signal Ye of the (k+2)-th line in the even field; the latch circuit 277 latches the signal G in the (k+1)-th line in the odd or even field; the latch circuit 278 latches the signal Cy the in k-th line in the odd field or the in (k+2)-th line in the even field; and the latch circuit 279 latches the signal W in (k+1)-th line in the odd or even field.

An adding circuit 280 adds the outputs of the latch circuits 276, 277, and an adding circuit 281 adds the outputs of the latch circuits 278, 279. A subtracting circuit 282 subtracts the output of the latch circuit 277 from the output of the latch circuit 276, while a subtracting circuit 283 subtracts the output of the latch circuit 279 from that of the latch circuit 278. The outputs of the adding circuits 280, 281 correspond to the luminance signal, while the output of the subtracting circuit 282 corresponds to the signal R, and that of the subtracting circuit 283 corresponds to the signal B. The luminance signal is obtained by alternately selecting the outputs of the adding circuits 280, 281 by shifting the switch 284 at every pixel.

The white balance circuit 285 regulates the level of the output (signal R) of the subtracting circuit 282 in such a manner that the color difference signal for a white object becomes equal to zero, according to the color temperature of the light source. The white balance circuit 284 similarly regulates the output level of the subtracting circuit 83. The gamma correction circuits 287, 288, 289 apply gamma corrections respectively to the output (signal R) of the white balance circuit 285, output (signal G) of the latch circuit 277, and output (signal B) of the white balance circuit 286, and the color difference signals R-Y, B-Y are obtained through a matrix circuit 290.

In the above-explained embodiment, there has not been explained, in particular, the sequential order of storage of the photoelectrically converted signals of the pixels of the image pickup device 210 in the frame memory 218. In the above-explained color filter arrangement, it is possible to at first store the signals of the lines corresponding to the odd field (for example k-th, (k+2)-th lines etc. in FIG. 28) in the frame memory 218, and then to store the signals of the lines corresponding to the even field (for example (k+1)-th, (k+3)-th lines etc. in FIG. 28), or to store the signals of all the pixels.

As will be easily understood from the foregoing description, the present invention produces a complete still image of a frame by an exposure, without the use of a specially arranged color filter. Also, the solid-state image pickup device can be made less expensive, as the same device can be used in the electronic still camera and the movie camera.

What is claimed is:

1. An image pickup apparatus comprising:
  (a) image pickup means having a plurality of photoelectric conversion elements disposed in plural rows, said elements being staggered by a half pitch from row to row;
  (b) memory means for storing a signal charge for at least one field from said image pickup means, line by line;
  (c) read-out means, including three read-out units, for reading signals of two predetermined neighboring rows of the elements and dividing said signals among said three read-out units, said read-out means reading out signals of two rows alternately and inputting the signals to said three read-out units alternately.

2. An image pickup apparatus according to claim 1, wherein said image pickup means and said memory means are arranged on the same substrate.

3. An image pickup apparatus according to claim 1, wherein said memory means is shielded from the light.

* * * * *

UNITED STATES PATENT AND TRADEMARK OFFICE
CERTIFICATE OF CORRECTION

PATENT NO. : 5,132,803
DATED : July 21, 1992
INVENTOR(S) : SUGA ET AL.

It is certified that error appears in the above-identified patent and that said Letters Patent is hereby corrected as shown below:

<u>AT [57] ABSTRACT</u> line 5, "fin" should read --in--.

Figure 4:
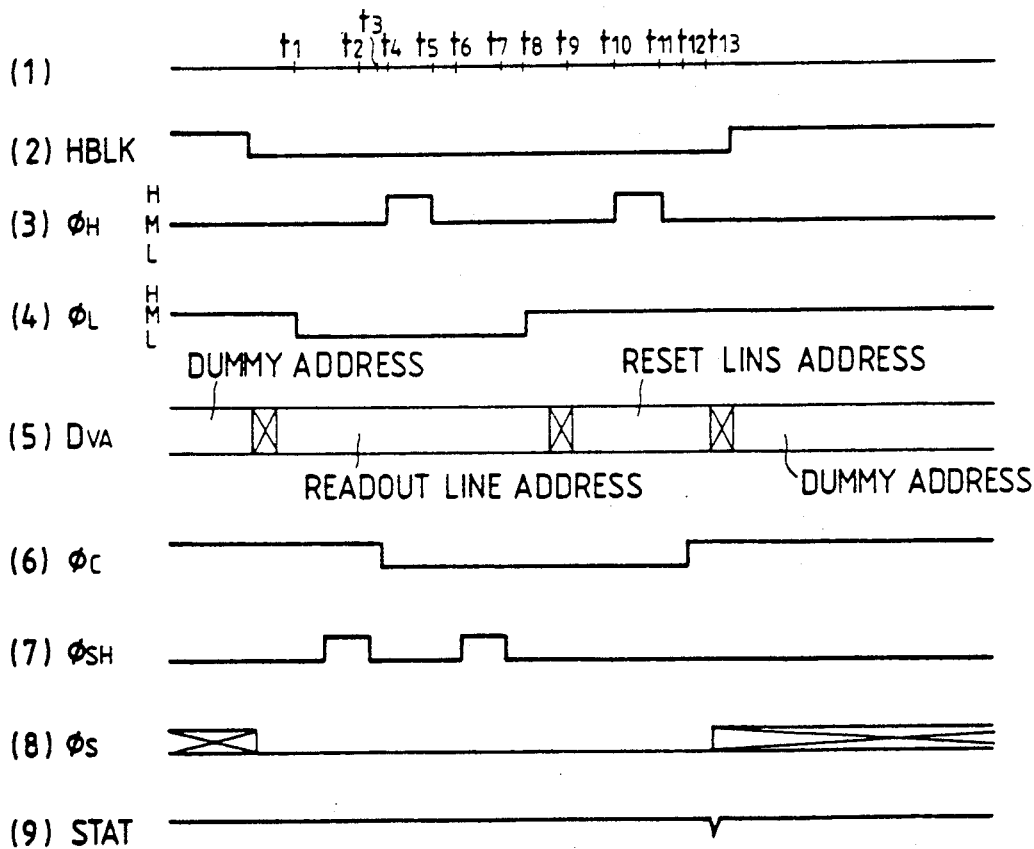
FIG. 4 is a timing chart of the operation of the area sensor shown in FIG. 1.

On drawing sheet 2;

Fig. 4, "LINS" should read --LINE--.

On drawing sheet 11:

Fig. 13B, "LINS" should read --LINE--.

<u>COLUMN 1</u>

Line 33, "lines 10" should read --lines 10V--.

<u>COLUMN 2</u>

Line 54, "seconds" should read --second--.

<u>COLUMN 3</u>

Line 5, "made" should be deleted.

<u>COLUMN 4</u>

Line 3, "allows," should read --allows--.
    Line 13, "to" should be deleted.

UNITED STATES PATENT AND TRADEMARK OFFICE
CERTIFICATE OF CORRECTION

PATENT NO. : 5,132,803
DATED : July 21, 1992
INVENTOR(S) : SUGA ET AL.

It is certified that error appears in the above-identified patent and that said Letters Patent is hereby corrected as shown below:

COLUMN 6

Line 39, "seconds" should read --second--.

COLUMN 8

Line 26, "motor 136" should read --motor 134--
Line 33, "motor 136" should read --motor 134--.
Line 42, "seconds" should read --second--.
Line 62, "$\mu$sX500 lines$\leq$2.5 ms," should read --$\mu$s X 500 lines = 2.5 ms,--.

COLUMN 9

Line 32, "designated" should read --designating--.
Line 36 "bits indicate" should read --bit indicates--.
Line 68, "same the" should read --the same--.

COLUMN 10

Line 41, "non" should read --non- --.

COLUMN 11

Line 25, "duces" should read --duce--.

COLUMN 12

Line 20, "example" should read --example,--.
Line 34, "428" should read --42B--.
Line 50, "8G," should read --18G,--.
Line 61, "signals" should read --signal--.

UNITED STATES PATENT AND TRADEMARK OFFICE
CERTIFICATE OF CORRECTION

PATENT NO. : 5,132,803

DATED : July 21, 1992

INVENTOR(S) : SUGA ET AL.

It is certified that error appears in the above-identified patent and that said Letters Patent is hereby corrected as shown below:

COLUMN 14

Line 18, "(n-1)-th" should read --(n+1)-th--.
Line 65, "signals $V_{0l}$," should read --signals $V_{0a}$,--.

COLUMN 15

Line 45, "signal $\varnothing_{SH}A$" should read --signal $\varnothing_{SHA}$--.

COLUMN 17

Line 1, "$n_c$-th" should read --$n_o$-th--.
Line 50, "Cy G" should read --Cy + G--.
Line 53, "$n_3$-th" should read --$n_c$-th--.

UNITED STATES PATENT AND TRADEMARK OFFICE
CERTIFICATE OF CORRECTION

PATENT NO. : 5,132,803
DATED : July 21, 1992
INVENTOR(S) : Suga et al

It is certified that error appears in the above-indentified patent and that said Letters Patent is hereby corrected as shown below:

<u>COLUMN 18</u>

Line 3, "following" should read --following, an--.
Line 24, "$n_3$-th" should read --$n_e$-th--.
Line 45, "the in" should read --in the-- (both occurrences).
Line 47, "in" should read --in the--.
Line 68, "circuit 83." should read --circuit 283.--.

Signed and Sealed this

Fourteenth Day of September, 1993

Attest:

BRUCE LEHMAN

Attesting Officer    Commissioner of Patents and Trademarks